United States Patent
Kim et al.

(10) Patent No.: US 10,846,504 B2
(45) Date of Patent: Nov. 24, 2020

(54) ELECTRONIC DEVICE INCLUDING BIOMETRIC SENSOR

(71) Applicant: SAMSUNG ELECTRONICS CO., LTD., Suwon-si (KR)

(72) Inventors: Jong-Il Kim, Anyang-si (KR); Jae-Young Kim, Ansan-si (KR); Oh-Hyuck Kwon, Yongin-si (KR); Hyung-Dal Kim, Yongin-si (KR); Kwang-Jin Bae, Suwon-si (KR); Young-Min Seo, Seongnam-si (KR); Young-Soo Lee, Hwaseong-si (KR); Dae-Kwang Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 380 days.

(21) Appl. No.: 15/868,174

(22) Filed: Jan. 11, 2018

(65) Prior Publication Data

US 2018/0225503 A1    Aug. 9, 2018

(30) Foreign Application Priority Data

Feb. 8, 2017   (KR) ........................ 10-2017-0017670

(51) Int. Cl.
    *G06K 9/28*    (2006.01)
    *G06K 9/00*    (2006.01)

(52) U.S. Cl.
    CPC ....... *G06K 9/00046* (2013.01); *G06K 9/0002* (2013.01); *G06K 9/00053* (2013.01)

(58) Field of Classification Search
    CPC .................. G06K 9/00006–9/00012; G06K 9/0004–9/00046
    See application file for complete search history.

(56) References Cited

U.S. PATENT DOCUMENTS

2006/0250605 A1* 11/2006 Chern ................ G06K 9/00046
                                                              356/71
2011/0063604 A1*  3/2011 Hamre ................ G02F 1/1326
                                                              356/71

(Continued)

FOREIGN PATENT DOCUMENTS

KR    10-2016-0059342    5/2016
KR       10-1683759     12/2016

(Continued)

OTHER PUBLICATIONS

Search Report dated Jul. 6, 2018 in counterpart European Patent Application No. 18155695.2.

(Continued)

*Primary Examiner* — Brian Werner
(74) *Attorney, Agent, or Firm* — Nixon & Vanderhye P.C.

(57) ABSTRACT

An electronic device is provided. The electronic device may include: a housing including a first face facing a first direction and a second face facing a second direction opposite the first direction, and further including a transparent window comprising at least a portion of the first face; a display device disposed between the first face and the second face of the housing and configured to display information to an outside through the transparent window; an illumination unit comprising light emitting circuitry disposed inside the first face of the housing and configured to emit light toward the transparent window; a reflective unit comprising a reflective surface and disposed between the illumination unit and the transparent window, and including a plurality of reflective structures configured to reflect light emitted from the illumination unit toward the transparent window; and a biometric sensor disposed to face at least a portion of the transparent window and configured to sense light reflected on the transparent window. The electronic device including a fingerprint sensor is capable of ensuring (Continued)

a superior performance using a light source in sensing fingerprint information of a user using a fingerprint sensor located in a display active region. Further, the electronic device is capable of effectively ensuring an amount of incident light transmitted to the biometric sensor using the reflective unit and the transparent window, which substantially completely reflects the light emitted from the light source.

19 Claims, 12 Drawing Sheets

(56) References Cited

U.S. PATENT DOCUMENTS

2014/0028629 A1 1/2014 Drumm et al.
2017/0220838 A1* 8/2017 He .................... G06F 3/0418

FOREIGN PATENT DOCUMENTS

| WO | 20141152002 | 9/2014 |
| WO | 2015/005959 | 1/2015 |

OTHER PUBLICATIONS

European Office Action dated May 20, 2020 for European Application No. 18155695.2.
Handbook of Fingerprint Recognition dated Jan. 1, 2003; XP 002320999; Maltoni et al..

* cited by examiner

ELECTRONIC DEVICE INCLUDING BIOMETRIC SENSOR

CROSS-REFERENCE TO RELATED APPLICATION

This application is based on and claims priority under 35 U.S.C. § 119 to Korean Patent Application Serial No. 10-2017-0017670, which was filed in the Korean Intellectual Property Office on Feb. 8, 2017, the content of which is incorporated by reference herein in its entirety.

TECHNICAL FIELD

The present disclosure relates generally to an electronic device in which light of a light source for a biometric sensor is substantially totally reflected to a transparent window on a display.

BACKGROUND

Typically, a display device is a device for outputting an image or image information, and a display device may be installed in most of electronic devices that are provided with an information communication function. Due to the development of electric and electronic technologies, the performance of display devices has remarkably developed such that the image quality of the display devices has been remarkably improved, and the display devices have been integrated with a touch panel or the like such that the display devices can be usefully utilized not only as output devices, but also as input devices.

An electronic device including a display device may recognize and confirm a user using information acquired from a portion of the user's body, in addition to calculating horizontal elements (e.g., a position and a movement) of an input, based on the input with respect to a touch panel. In particular, a personal authentication method using personal unique features, such as a fingerprint, a voice, a face, a hand, and an iris, is widely used for in order to recognize a user. Recently, various additional functions utilizing personal information, such as finance and security, have been provided not only through communication functions, such as telephone and text message transmission services, but also through electronic devices such as portable devices, and need for a locking device for such electronic devices is becoming more important. In order to improve the locking effect, an electronic device equipped with a locking device through biometric information recognition of a user is being developed in earnest.

According to the prior art, an electronic device may calculate horizontal and vertical positions of a touch input that is input on one face of the electronic device based on various types of touch inputs. In addition, the electronic device is mounted with a fingerprint recognition sensor capable of recognizing a user.

However, since a conventional fingerprint recognition sensor has a hardware structure separate from a display, a separate space is required. As the mobile device becomes smaller and slimmer, the position and space for placement of the fingerprint recognition sensor become restricted. In addition, in order to sense biometric information such as a fingerprint, it is necessary for a user to be positioned close to the sensor, thereby causing a problem in that the sensor is exposed to the outside of the electronic device, and thus the appearance of the electronic device deteriorates.

SUMMARY

An electronic device according to various example embodiments of the present disclosure is able to address the restriction of the mounting space by disposing a fingerprint sensor in an active display region.

In addition, a light source in sensing fingerprint information of a user using a fingerprint sensor located in an active display region may be used to ensure a predetermined performance.

According to an example embodiment of the present disclosure, an electronic device may include: a housing including a first face facing a first direction and a second face facing a second direction opposite the first direction, and further including a transparent window that forms at least a portion of the first face; a display device disposed between the first face and the second face of the housing and configured to display information to an outside through the transparent window; an illumination unit comprising light emitting circuitry disposed inside the first face of the housing and configured to emit light toward the transparent window; a reflective unit comprising reflective surfaces disposed between the illumination unit and the transparent window, and including a plurality of reflective structures configured to reflect light emitted from the illumination unit toward the transparent window; and a biometric sensor disposed to face at least a portion of the transparent window and configured to sense light reflected on the transparent window.

According to an example embodiment of the present disclosure, an electronic device may include: a housing including a transparent window exposed to an outside; a printed circuit unit comprising a printed circuit disposed within the housing; a reflective unit comprising reflective surfaces disposed between the transparent window and the printed circuit unit and including a plurality of reflective structures configured to transmit light emitted from an illumination unit comprising light emitting circuitry electrically connected to the printed circuit unit to the transparent window; and a fingerprint sensor disposed between the transparent window and the printed circuit unit, the fingerprint sensor being electrically connected to at least a portion of the printed circuit unit and configured to sense light transmitted through the transparent window.

According to various embodiments of the present disclosure, the electronic device includes a biometric sensor in the active display region configured to acquire biometric information. Thus, it is possible to eliminate and/or reduce a need to identify a user's biometric information at a specific location other than the display, and to address the problem of restricted mounting space in the electronic device.

According to various embodiments of the present disclosure, the electronic device uses a light source in sensing the user's fingerprint information using a fingerprint sensor located in the active display region. Thus, it is possible to ensure a superior performance.

According to various embodiments of the present disclosure, the electronic device is capable of effectively ensuring an amount of incident light transmitted to the biometric sensor using the reflective unit and the transparent window, which totally and/or substantially totally reflect the light emitted from the light source.

According to various embodiments of the present disclosure, since the electronic device including the biometric sensor does not additionally include a separate sensor structure other than the display arrangement space, and uses a biometric sensor located in the active display region, it is possible to increase the mounting space. Further, since parts exposed to the outside are removed, it is possible to provide an effective waterproof function.

BRIEF DESCRIPTION OF THE DRAWINGS

The above and other aspects, features, and attendant advantages of the present disclosure will be more apparent and readily appreciated from the following detailed description, taken in conjunction with the accompanying drawings, in which like reference numerals refer to like elements, and wherein.

DETAILED DESCRIPTION

Figure 1:
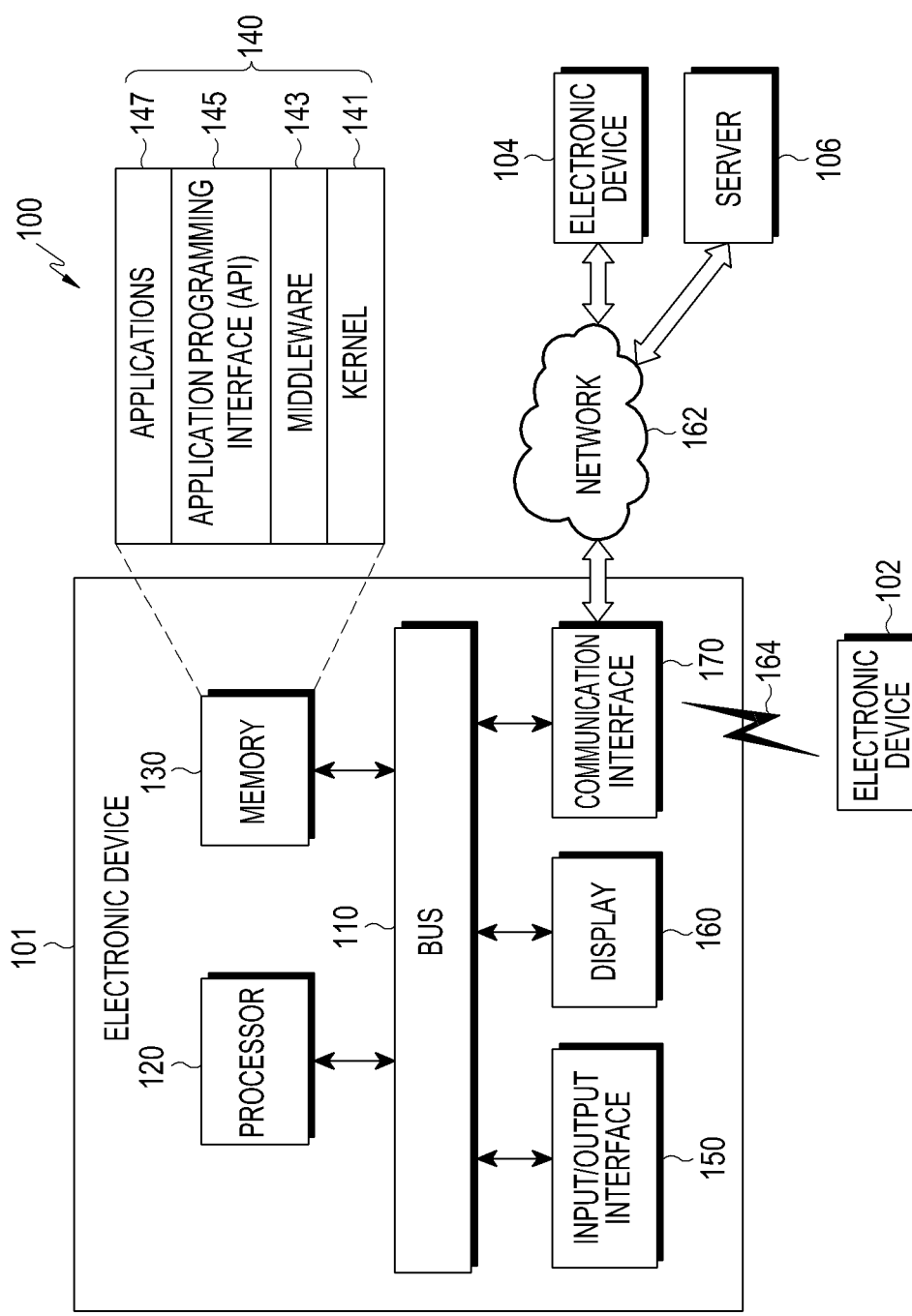
FIG. 1 is a diagram illustrating an example electronic device in a network environment according to various example embodiments of the present disclosure.

Hereinafter, various example embodiments of the present disclosure will be described with reference to the accompanying drawings. The various example embodiments and the terms used therein are not intended to limit the technology disclosed herein to specific forms, and should be understood to include various modifications, equivalents, and/or alternatives to the corresponding embodiments. In the description of the drawings, similar reference numerals may be used to designate similar elements. A singular expression may include a plural expression unless they are definitely different in a context. As used herein, singular forms may include plural forms as well unless the context clearly indicates otherwise. The expression "a first", "a second", "the first", or "the second" used in various embodiments of the present disclosure may modify various components regardless of the order and/or the importance but does not limit the corresponding components. When an element (e.g., first element) is referred to as being "(functionally or communicatively) connected," or "directly coupled" to another element (second element), the element may be connected directly to the another element or connected to the another element through yet another element (e.g., third element).

The expression "configured to" as used in various embodiments of the present disclosure may be interchangeably used with, for example, "suitable for", "having the capacity to", "designed to", "adapted to", "made to", or "capable of" in terms of hardware or software, according to circumstances. Alternatively, in some situations, the expression "device configured to" may mean that the device, together with other devices or components, "is able to". For example, the phrase "processor adapted (or configured) to perform A, B, and C" may refer, for example, to a dedicated processor (e.g., embedded processor) for performing the corresponding operations or a generic-purpose processor (e.g., central processing unit (CPU) or application processor (AP)) that can perform the corresponding operations by executing one or more software programs stored in a memory device.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device, or the like, but is not limited thereto. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit), or the like, but is not limited thereto. In some embodiments, the electronic device may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame, or the like, but is not limited thereto.

In other embodiments, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyrocompass), avionics, security devices, an automotive head unit, a robot for home or industry, an Automatic Teller's Machine (ATM) in banks, Point Of Sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.), or the like, but is not limited thereto. According to some embodiments, an electronic device may include at least one of a part of furniture or a building/structure, an electronic board, an electronic signature receiving device, a projector, and various types of measuring instruments (e.g., a water meter, an electric meter, a gas meter, a radio wave meter, and the like), or the like, but is not limited thereto. In various embodiments, the electronic device may be flexible, or may be a combination of one or more of the aforementioned various devices. The electronic device according to an example embodiment of the present disclosure is not limited to the above described devices. In the present disclosure, the term "user" may indicate a person using an electronic device or a device (e.g., an artificial intelligence electronic device) using an electronic device.

An electronic device 101 within the network environment 100, in various example embodiments, will be described with reference to FIG. 1. The electronic device 101 may include a bus 110, a processor (e.g., including processing circuitry) 120, a memory 130, an input/output interface (e.g., including input/output circuitry) 150, a display 160, and a communication interface (e.g., including communication circuitry) 170. In a certain embodiment, at least one of the above-mentioned components may be omitted from the electronic device 101 or the electronic device 10 may additionally include other components.

The bus 110 may include a circuit that interconnects the above-mentioned components 120 to 170 and transfers communication information (e.g., a control message or data) among the components 120 to 170.

The processor 120 may include various processing circuitry, such as, for example, and without limitation, one or more of a dedicated processor, a Central Processing Unit (CPU), an Application Processor (AP), and a Communication Processor (CP), or the like. The processor 120 may execute, for example, an arithmetic operation or data processing that is related to a control and/or communication of one or more other components of the electronic device 101.

The memory 130 may include a volatile memory and/or a non-volatile memory. The memory 130 may store, for example, commands or data that are related to one or more other components of the electronic device 101. According to one embodiment, the memory 130 may store software and/or a program 140. The program 140 may include, for example, kernel 141, middleware 143, an Application Programming Interface (API) 145, and/or an application 147. At least one of the kernel 141, the middleware 143, and the API 145 may be referred to as an Operating System (OS). The kernel 141 may control or manage, for example, system resources (e.g., the bus 110, the processor 120, and the memory 130) that are used for executing operations or functions implemented in the other programs (e.g., the middleware 143, the API 145, or the application 147). In addition, the kernel 141 may provide an interface that allows the middleware 143, the API 145, or the application 147 to access individual components of the electronic device 101 so as to control or manage the system resources.

The middleware 143 may play an intermediary role such that, for example, the API 145 or the application 147 may communicate with the kernel 141 so as to exchange data. In addition, the middleware 143 may process one or more task requests which are received from the applications 147, according to priority. For example, the middleware 143 may assign the priority to be capable of using a system resource of the electronic device 101 (e.g., the bus 110, the processor 120, or the memory 130) to at least one of the applications 147, and may process the one or more task requests. The API 145 is, for example, an interface that allows the applications 147 to control functions provided from the kernel 141 or the middleware 143, and may include, for example, one or more interfaces or functions (e.g., commands) for a file control, a window control, an image processing, or a character control.

The input/output interface 150 may include various input/output circuitry and transmit commands or data, which are entered from, for example, a user or any other external device, to the other component(s) of the electronic device 101, or may output commands or data, which are received from the other component(s) of the electronic device 101, to the user or the other external device.

The display device 160 may include, for example, a Liquid Crystal Display (LCD), a Light Emitting Diode (LED) display, an Organic Light Emitting Diode (OLED) display, a MicroElectroMechanical System (MEMS), or an electronic paper display, or the like, but is not limited thereto. The display 160 may display various contents (e.g., text, image, video, icon, or symbol) to, for example, the user. The display 160 may include a touch screen, and may receive a touch input, a gesture input, a proximity input, or a hovering input that is made using, for example, an electronic pen or a part of the user's body.

The communication interface 170 may include various communication circuitry and set, for example, communication between the electronic device 101 and an external device (e.g., a first external electronic device 102, a second external device 104, or a server 106). For example, the communication interface 170 may be connected with a network 162 through wired or wireless communication so as to communicate with the external device (e.g., the second external electronic device 104 or the server 106).

The wireless communication may include a cellular communication that uses at least one of, for example, Long-Term Evolution (LTE), LTE Advance (LTE-A), Code Division Multiple Access (CDMA), Wideband CDMA (WCDMA), Universal Mobile Telecommunication System (UMTS), Wireless Broadband (WiBro), and Global System for Mobile communication (GSM). According to one embodiment, the wireless communication may include at least one of, for example, Wireless Fidelity (WiFi), Bluetooth, Bluetooth Low Energy (BLE), ZigBee, Near Field Communication (NFC), Magnetic Secure Transmission, Radio Frequency (RF), and Body Area Network (BAN). According to one embodiment, the wireless communication may include GNSS. The GNSS may include, for example, at least one of Global Positioning System (GPS), Global Navigation Satellite System (Glonass), Beidou Navigation Satellite System (hereinafter, "Beidou"), Galileo, and the European global satellite-based navigation system, according to, for example, a use area or band width. Herein, "GPS" may be interchangeably used with "GNSS" below. The wired communication may use at least one of, for example, Universal Serial Bus (USB), High Definition Multimedia Interface (HDMI), Recommended Standard 232 (RS-232), power line communication, and Plain Old Telephone Service (POTS). The network 162 may include a telecommunication network (e.g., at least one of a computer network (e.g., LAN or WAN), the internet, and a telephone network). Additionally, the communication interface 170 may establish a short-range wireless communication connection 164 with another electronic device, e.g., electronic device 102.

Each of the first and second external electronic devices 102 and 104 may be the same type as or different from the electronic device 101. According to various embodiments, all or some of the operations to be executed by the electronic device 101 may be executed by another electronic device or a plurality of other electronic devices (e.g., the electronic devices 102 and 104 or the server 106). According to one embodiment, in the case where the electronic device 101 should perform a certain function or service automatically or by a request, the electronic device 101 may request some functions or services that are associated therewith from the other electronic devices (e.g., the electronic devices 102 and 104 or the server 106), instead of, or in addition to, executing the functions or service by itself. The other electronic devices (e.g., the electronic devices 102 and 104 or the server 106) may execute the requested functions or additional functions, and may deliver the results to the electronic device 101. The electronic device 101 may provide the received results as they are or may additionally process the received results so as to provide the requested functions or services. For this purpose, for example, a cloud computing technique, a distributed computing technique, or a client-server computing technique may be used.

Figure 2A:
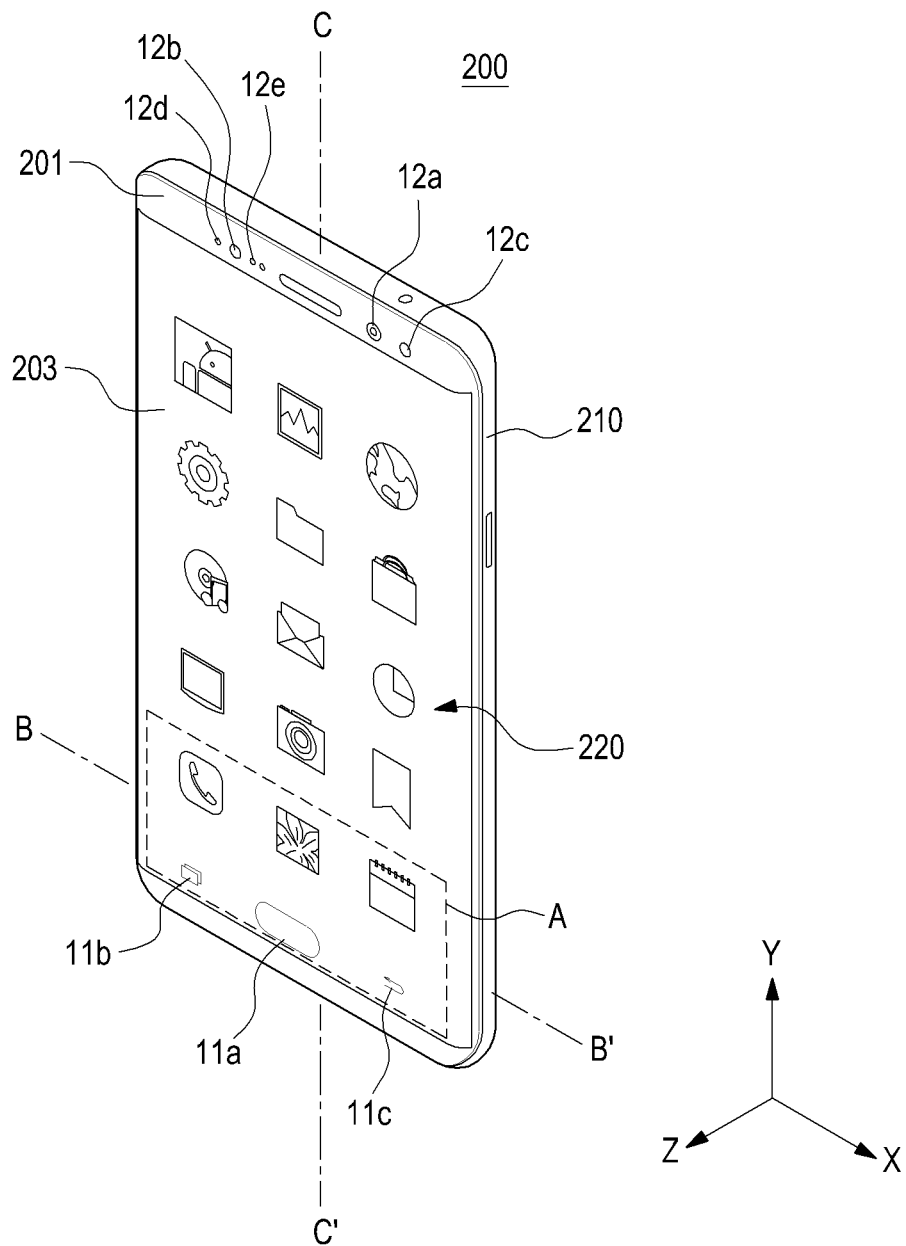
FIG. 2A is a perspective view illustrating an example electronic device according to various example embodiments of the present disclosure.
Figure 2B:
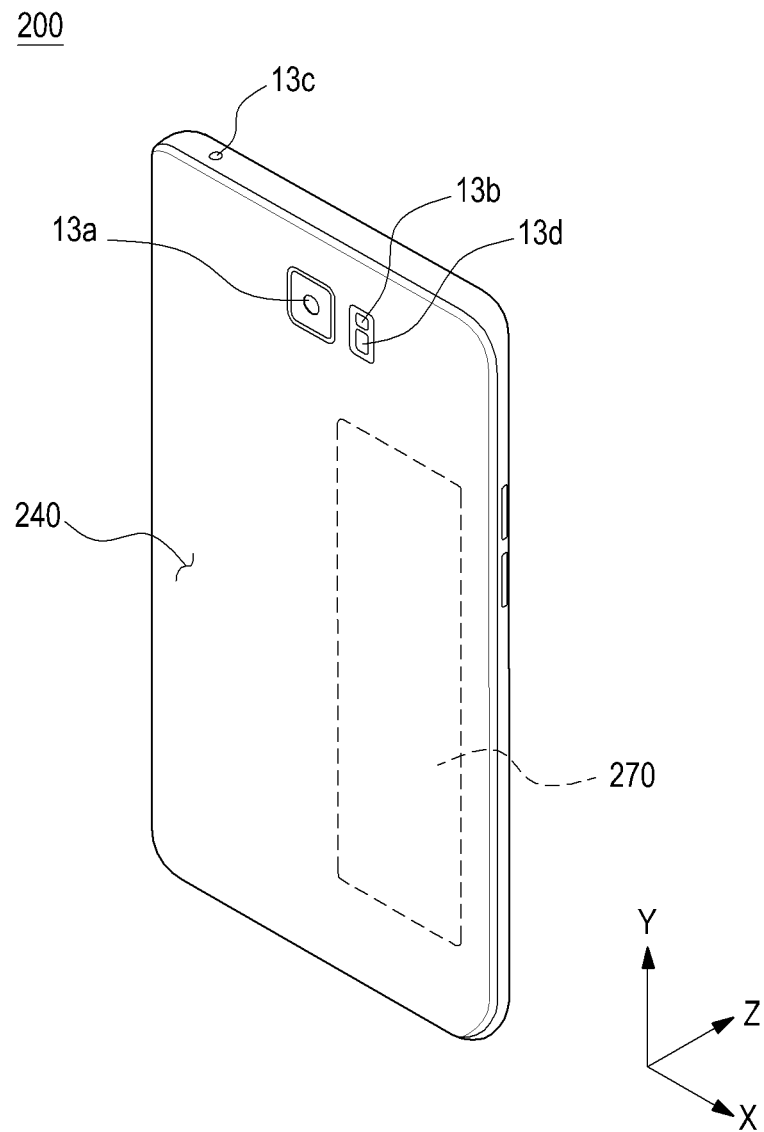
FIG. 2B is a perspective view illustrating an example electronic device in which the electronic device is viewed from another direction according to various example embodiments of the present disclosure.

FIG. 2A is a perspective view illustrating an example electronic device 200 according to various example embodiments of the present disclosure, and FIG. 2B is a perspective view illustrating the example electronic device 200 according to various example embodiments of the present disclosure, viewed in another direction.

In FIGS. 2A and 2B, an "X-axis" in an orthogonal coordinate system of three axes may correspond to the width direction of the electronic device 200, a "Y-axis" may correspond to the length direction of the electronic device 200, a "Z-axis" may correspond to the thickness direction of the electronic device 200.

As illustrated in FIGS. 2A and 2B, the electronic device 200 may include a housing 210 and a display device 220. The housing 210 may include a first face 201 facing in a first (+Z) direction and a second face 240 facing in a second (−Z) direction that is opposite the first (+Z) direction. The first face 201 of the housing 201 may be the front face, and the second face 240 may be the rear cover. The housing 210 may be opened in the front face 201, and a transparent cover 203 may be mounted to form at least a portion of the first face 201 of the housing 210, and may close the opened front face 201 of the housing 210. The electronic device 200 may be provided with a keypad including mechanically operating buttons or touch keys 11a, 11b, and 11c, which are provided at one region of the transparent window 203 on, for example, the front face 201 of the housing 210. The touch key may generate an input signal by a user's body contact. According to various embodiments, the keypad may be implemented with only the mechanical buttons, or with only the touch keys. As another example, the keypad may be implemented as a combination form of a mechanical button type and a touch type. In addition, the keypad may provide various images that are expressed on the display device corresponding to the length of time for which the buttons are touched or pressed long or short.

According to various embodiments, the housing 210 is configured to accommodate various electronic components and the like, and at least a portion of the housing 210 may be made of a conductive material. For example, the housing 210 may include sidewalls that form the external faces of the electronic device 200, and the externally exposed portions of the electronic device 200 may be made of a conductive metal. A printed circuit (not illustrated) and/or a battery 270 may be accommodated in the housing 210. For example, a processor, a communication module, various interfaces (e.g., interfaces 150 and 170 in FIG. 1), a power management module, etc. may be mounted on the printed circuit unit (not illustrated) in the form of integrated circuit chips. As another example, a control circuit may also be configured as an integrated circuit chip and may be mounted on the printed circuit unit. For example, the control circuit may be a portion of the above-described processor or communication module. Power can be secured by housing the battery 270 in the housing 210.

According to various embodiments of the present disclosure, a first camera 12a, a light source unit 12b, and/or an iris camera 12c may be included in the upper end region of the front face of the electronic device 200. For example, the light source unit 12b may be an IR LED, and the iris camera 12c may recognize iris information by imaging the user's eyes using red near-infrared rays emitted from the IR LED as a light source. In another example, the electronic device 200 may include a light source unit indicating lamp 12d and an illuminance sensor or a proximity sensor 12e in the upper end region of the front face thereof. In another example, the electronic device 200 may include a second camera 13a, a heart rate monitor (HRM) 13d, and/or a flash 13b on the rear face thereof, and may include a microphone 13c on the top face thereof.

According to various embodiments, the display device 220 may be exposed through the front face 201 of the housing 210. The display device 220 may be at least partially made of a material that transmits radio waves or magnetic fields, and may be mounted on the front face of the housing 210. The display device 220 may include a display panel mounted on an inner face of a transparent window 203, which is made of a tempered glass material. A touch panel may be mounted between the transparent window 203 and the display panel. For example, the display device 220 may be an output device for outputting a screen, and may be used as an input device equipped with a touch screen function.

According to various embodiments, the electronic device 200 may include a rear cover 240 that protects the rear face of the housing 210. The rear cover 240 may be installed to face a direction (second direction) that is opposite the display device 220, and may be made of a material capable of transmitting radio waves or magnetic fields (e.g., tempered glass or a synthetic resin). The rear cover 240 may form the external appearance of the electronic device 200 together with the housing 210 and the display device 220.

According to various embodiments of the present disclosure, the electronic device 200 may have a biometric sensing region (e.g., a fingerprint sensing region (not illustrated)), which is configured to recognize a fingerprint in at least a portion of an active region A of the display (a region in which actual display pixels are implemented so as to display information). Since the biometric sensing region is formed in the active region A such that a separate sensor structure other than the display layout space is not additionally required, the mounting space of the electronic device 200 can be enlarged. Thus, the electronic device 200 may include a display that is implemented to extend in the longitudinal direction.

Hereinafter, a biometric sensor configured to sense the user's biometric information through the active region A and a structure configured to transmit light to the biometric sensor will be described in greater detail.

Figure 3:
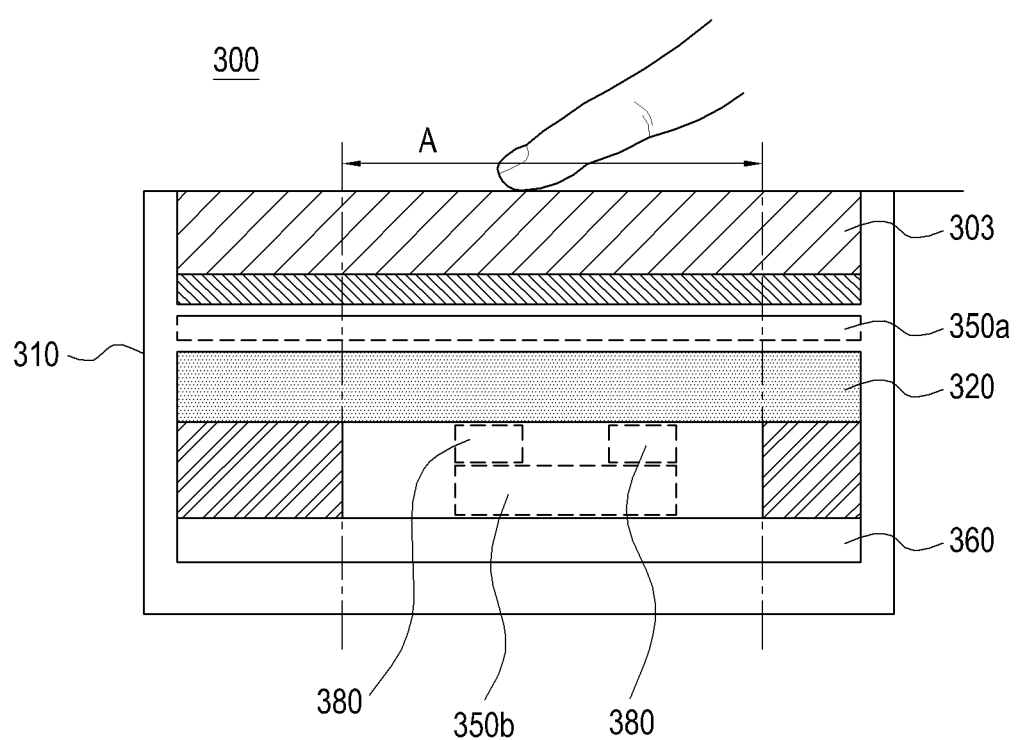
FIG. 3 is a cross-sectional view of an example electronic device taken along line B-B' in FIG. 2A according to various example embodiments of the present disclosure.

FIG. 3 is a cross-sectional view of the electronic device taken along line B-B' in FIG. 2A according to various example embodiments of the present disclosure. A housing 310, a transparent window 303, and a display device 320 of the electronic device 300 illustrated in FIG. 3 may be a part or all of the structure of the housing 210, the transparent window 203, and the display device 220 of FIG. 2.

Referring to FIG. 3, the electronic device 300 may include a biometric sensor configured to sense biometric information of a user through the display device 320. The biometric sensor may be a fingerprint sensor 350a or 350b, and the fingerprint sensor 350a or 350b may include a first fingerprint sensor 350a or a second fingerprint sensor 350b.

According to various embodiments, the fingerprint sensor 350a or 350b may be implemented in an electrostatic manner by forming a sensing electrode on the surface of the display device 320. As another example, the fingerprint sensor 350a or 350b may be implemented in an ultrasonic type by forming an ultrasonic transmitter/receiver adjacent to the layer in which the fingerprint sensor 350a or 350b is disposed.

According to various embodiments, in the electronic device 300, the first fingerprint sensor 350a may be placed in the upper portion of the display device 320. According to an example embodiment, the first fingerprint sensor 350a may be disposed between the transparent window 303 and the display device 320, and may sense the user's fingerprint in the active region A.

According to various embodiments, in the electronic device 300, the second fingerprint sensor 350b may be placed in the lower portion of the display device 320. According to an example embodiment, the second fingerprint sensor 350b may be configured as an optical fingerprint sensor that senses the user's fingerprint using light emitted from the display device 320 as a light source. The emitted light may be implemented through R, G, or B pixels of the display of the display device 320 or light emitted from a light source (e.g., an IR LED) separately implemented within the display device 320. As another example, the electronic device 300 may further include an impact mitigation member 380 in order to protect the second fingerprint sensor 350b from damage caused by an external impact. The impact mitigation member 380 may be disposed between the second fingerprint sensor 350b and the display device 320. As another example, there may be provided a plurality of impact mitigation members 380, which may be disposed on both side ends of the second fingerprint sensor 350b to be spaced apart from each other. However, the arrangement and the number of the impact mitigation members 380 are not limited to the above-described embodiment, and the impact mitigation members 380 may be formed in various arrangements and numbers so as to protect the second fingerprint sensor 350b.

According to various embodiments, a printed circuit unit 360 may be disposed under the second fingerprint sensor 350b and may be electrically connected to the second fingerprint sensor. As another example, the electronic device 300 may acquire the user's touch input by controlling the first fingerprint sensor 350a or the second fingerprint sensor 350b without including a separate touch sensor (not illustrated).

Figure 4:
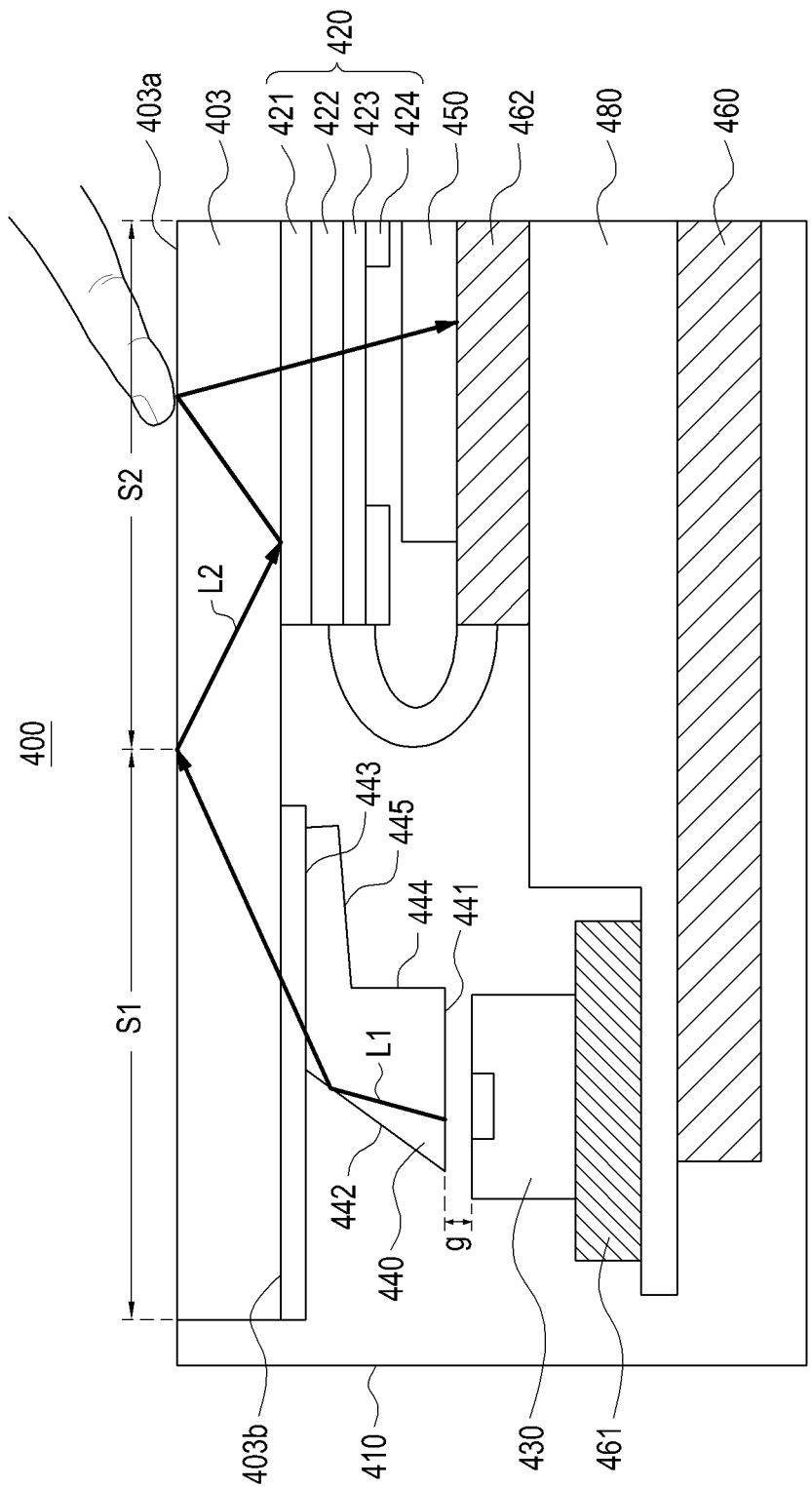
FIG. 4 is a cross-sectional view of an example electronic device taken along line C-C' in FIG. 2A according to various example embodiments of the present disclosure.

FIG. 4 is a cross-sectional view of the electronic device taken along line C-C' in FIG. 2A according to various example embodiments of the present disclosure. A housing 410, a transparent window 403, and a display device 420 of the electronic device 400 illustrated in FIG. 4 may be a part or all of the structure of the housing 210, the transparent window 203, and the display device 420 of FIG. 2.

Referring to FIG. 4, the electronic device 400 may include: a housing 410; a display device 420, which is exposed by a transparent window 403 that forms the top surface of the housing 410; an illumination unit (e.g., including light emitting circuitry) 430, which is disposed inside the housing 410 and provides light; a light coupler (e.g., reflective unit) 440, which is disposed on one face of the display device 420 and reflects the light provided from the illumination unit 430 so as to transmit the reflected light to the transparent window 403; and a biometric sensor. The biometric sensor may include a fingerprint sensor 450.

According to various embodiments, in the electronic device 400, the transparent window 403 may be positioned on the front face of the housing 410 to protect the display device 420 from the external environment. The display device 420 may be connected to the fingerprint sensor 450 and/or the touch sensor in the form of a panel incorporated in the display device 420, and may be utilized not only as an output device, but also as an input device.

According to various embodiments, the housing 410 may include a support member 480 that supports the illumination unit 430, the fingerprint sensor 450, and/or the printed circuit unit 460. The support member 480 may be made of a metallic material, and may be disposed between the display device 420 and the rear cover (the rear cover 240 of FIG. 2). For example, the support member 480 may be interposed between the display device 420 and the printed circuit unit 460. The support member 480 may prevent and/or reduce the occurrence of the integrated circuit chips mounted on the printed circuit unit 460 from coming into contact with the display device 420, and may provide an electromagnetic shield function, thereby preventing and/or reducing electromagnetic interference between the integrated circuit chips. The support member 480 may compensate for the rigidity of the electronic device 400. For example, some components of the housing 210 may be formed with a plurality of openings or recesses depending on the arrangement of the electronic components inside the electronic device 400, which may reduce the rigidity of the electronic device 400. The support member 480 may be mounted in and fastened to the electronic device 400 in order to improve the rigidity of the electronic device 400. According to various embodiments, the printed circuit unit 460 may be disposed between the display device 420 and the rear cover, and may include at least one conductive path.

According to various embodiments, the printed circuit unit 460 may include at least one printed circuit board or the like that extends in one direction for electrical connection to components, such as the illumination unit 430 and the fingerprint sensor 450. According to an example embodiment, the illumination unit 430 may be disposed on a first printed circuit board 461 extending from the printed circuit unit 460, and the illumination unit 430 may be electrically connected to the first printed circuit board 461. According to one embodiment, the fingerprint sensor 450 may be disposed on a second printed circuit board 462 extending from the printed circuit unit 460, and the fingerprint sensor 450 may be electrically connected to the second printed circuit board 462.

According to various embodiments, the illumination unit 430, which provides light, may be disposed between the first printed circuit board 461 and the light coupler 440, and may be electrically connected to the first printed circuit board 461 so as to emit light. The first printed circuit board 461 may be a flexible printed circuit board. The illumination unit 430 may be, for example, an IR LED module, and may radiate light to one face of the light coupler 440.

According to various embodiments, the light coupler 440 may be disposed between the transparent window 403 and the illumination unit 430, and may provide the light received from the illumination unit 430 to the transparent window 403. The light incident into the light coupler 440 may form a first path L1 including total or near total internal reflection. For example, the first path L1 of the light of the light coupler 440, to which the light of the illumination unit 430 is incident, may provide at least one total reflection, and through the total reflection, the path of light, which is provided from the illumination unit 430 and directed upward or rightward and upward, may be changed to be further tilted upward.

According to various embodiments, the light coupler 440 is fabricated in a shape in which respective faces, which form the light coupler 440, and the angles between the faces have different lengths and slopes, and may be made of a material that provides high transmissivity. For example, the light coupler 440 may have a transmissivity of about 90% or more, and may be made of a material including transparent silicon.

According to various embodiments, the light coupler 440 may include a first face 441, which receives light emitted from the illumination unit 430, a second face 442, which forms an inclined surface with respect to the first face 441, and a third face 443, which is parallel to the first face 441 and provides the light to the transparent window 403. For example, the space of the light coupler 440 surrounded by the first, second, and third faces 441, 442, and 443 may form a first path L1 of the light. As another example, the first face 441 may be disposed to face the top face of the illumination unit 430 and may have a length different from that of the top face of the illumination unit 430. As another example, the first face 441 of the light coupler 440 may be disposed to have a predetermined gap g with the top face of the illumination unit 430, and the predetermined gap may be an air gap and may have a refractive index, which is different that of the inside of the light coupler 440.

According to various embodiments, the second face 442 may be an inclined face that forms a predetermined angle with respect to the first face 441. For example, the angle formed by the first face 441 and the second face 442 may be an acute angle. As another example, the second face 442 may totally reflect light transmitted from the first face 441 and may provide the light to the third face 443.

According to various embodiments, the third face 443 may transmit light provided from the second face 442 so as to cause the light to enter the transparent window 403. The third face 443 may be disposed in parallel with the first face 441, and may have a length different from that of the first face 441. As another example, the third face 443 may be disposed to face the bottom face 403b of the transparent window 403, and may be bonded to the bottom face 403b of the transparent window 403 using an adhesive or the like.

According to various embodiments, the light coupler 440 may include a fourth face 444 and a fifth face 445, in addition to the first face 441, the second face 442, and the third face 443, which are arranged on the first path L1 of the light. The fourth face 444 and the fifth face 445 may support the light coupler 440 and may connect the first face 441 and the third face 443 to each other. According to an example embodiment, the light coupler 440 may provide a space for the first path L1 of the light in one form via the fourth face 444 and the fifth face 445, but the present disclosure is not limited thereto. The space may be provided in various forms depending on the internal structure of the electronic device 400, or may also be formed as one face.

According to various embodiments, the transparent window 403 may reflect the light transmitted from the light coupler 440 to the top face 403a and/or the bottom face 403b of the transparent window 403, so that a second path L2 of light can be formed inside the transparent window 403. The light passing through the second path L2 of light may be transmitted to the fingerprint sensor 450 disposed below the active region of the transparent window 403 (the active region A of FIG. 2).

According to various embodiments, the light transmitted along the top face 403a and the bottom face 403b of the transparent window 403 may be directed to the fingerprint of the user who touches the active region A of the transparent window 403. The light is reflected by a ridge and/or a valley of the user's fingerprint, and the reflected light is able to reach the fingerprint sensor 450.

According to various embodiments, the fingerprint sensor 450 may be disposed under the transparent window 403, and may receive the light provided to the transparent window 403 so as to sense fingerprint information of the user. The fingerprint sensor 450 may be disposed on the top face of the second printed circuit board 462, and may be electrically connected to the second printed circuit board 462.

According to various embodiments, the fingerprint sensor 450 may focus the light reflected by the transparent window 403, and a lens having a short focal length may be used in order to miniaturize an optical scanning device.

According to various embodiments, the display device 420 disposed between the transparent window 403 and the fingerprint sensor 450 may include a dielectric layer 421 and an optical layer 422. The dielectric layer 421 may be disposed to be in contact with the transparent window 403 and may include, for example, silicon, air, foam, a membrane, an Optical Clear Adhesive (OCA), sponge, rubber, ink, or a polymer (PC or PET). The optical layer 422 may be disposed under the dielectric layer 421.

According to various embodiments, the optical layer 422 transmits an image output from the display panel 423, and may be stacked on the display panel 423 as at least one layer. For example, the optical layer 422 may include an optical compensation film or the like for correcting a phase difference or the like of an image output from the display panel 423.

According to various embodiments, a film layer 424 may be disposed between the transparent window 403 and the second printed circuit board 462 so as to suppresses light scattering. The film layer 424 may control the light to be directed toward the transparent window 403 so as to suppress the scattering of light emitted to the outside (e.g., in the rearward direction of the electronic device 400). However, one region of the film layer 424 may be opened in order to provide light transmitted from the transparent window 403 to the fingerprint sensor 450. For example, the film layer 424 may be opened in a region corresponding to the fingerprint sensor 450 so as to provide a space, which allows the light reflected from one region of the transparent window 403 to reach the fingerprint sensor 450.

According to various embodiments, the light coupler 440 and the illumination unit 430 may be positioned below the first region S1 of the transparent window 403, and the fingerprint sensor 450 may be positioned below the second region S2 of the transparent window 403. The first region S1 and the second region S2 are adjacent to each other, and the transparent window 403 may form the second path L2 of the light generated from the illumination unit 430 in the first region S1 and the second region S2. According to one embodiment, the second path L2 may be formed by repeated total reflection on the top and bottom faces of the transparent window 403.

Figure 5:
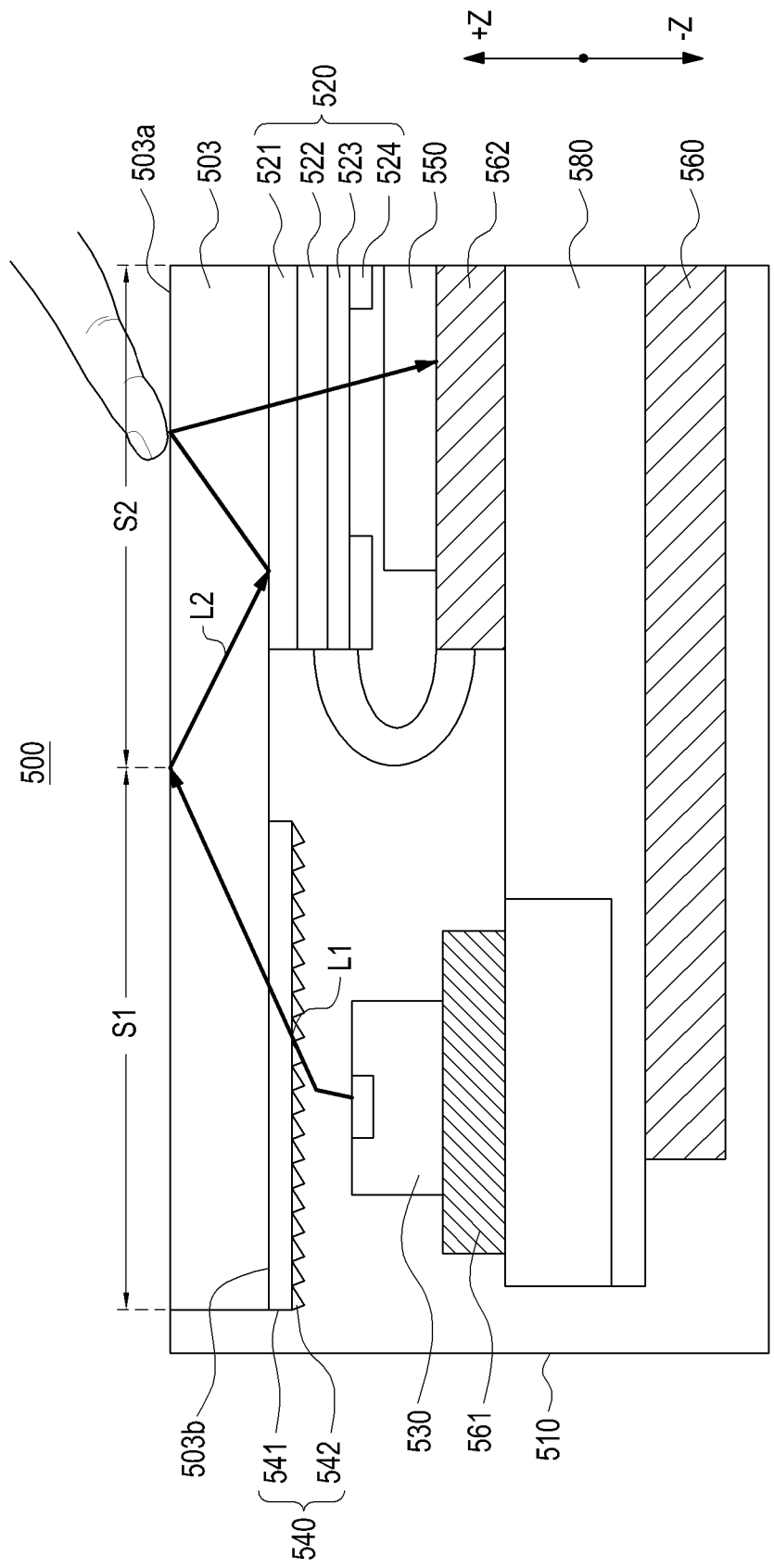
FIG. 5 is a cross-sectional view of an example electronic device taken along line C-C' in FIG. 2A according to another of various example embodiments of the present disclosure.

FIG. 5 is a cross-sectional view of an example electronic device taken along line C-C' in FIG. 2A according to another of the various example embodiments of the present disclosure. A housing 510, a transparent window 503, and a display device 520 of the electronic device 500 illustrated in FIG. 5 may be a part or all of the structure of the housing 410, the transparent window 403, and the display device 420 of FIG. 4.

Referring to FIG. 5, the electronic device 500 may include a housing 510, a display device 520, which is exposed by a transparent window 503 that forms the top surface of the housing 510, an illumination unit (e.g., including light emitting circuitry) 530, which is disposed inside the housing 510 and provides light, a reflective unit (e.g., including a light reflector) 540, which is disposed on one face of the display device 520 and reflects the light provided from the illumination unit 530 so as to transmit the reflected light to the transparent window 503, and a fingerprint sensor 550.

According to various embodiments, in the electronic device 500, the transparent window 503 may be positioned on the front face of the housing 510 to protect the display device 520 from the external environment. The display device 520 may be connected to the fingerprint sensor 550 and/or the touch sensor in the form of a panel incorporated in the display device 520, and may be utilized not only as an output device, but also as an input device.

According to various embodiments, the housing 510 may include a support member 580 that supports the illumination unit 530, the fingerprint sensor 550, and/or the printed circuit unit 560. The support member 580 may be made of a metallic material, and may be disposed between the display device 520 and the rear cover (the rear cover 240 of FIG. 2). For example, the support member 580 may be interposed between the display device 520 and the printed circuit unit 560. The support member 580 may prevent and/or reduce the occurrence of the integrated circuit chips mounted on the printed circuit unit 560 from coming into contact with the display device 520, and may provide an electromagnetic shield function, thereby preventing and/or reducing electromagnetic interference between the integrated circuit chips. The support member 580 may compensate for the rigidity of the electronic device 500.

According to various embodiments, the printed circuit unit 560 may include at least one printed circuit board or the like that extends in one direction for electrical connection to components, such as the illumination unit 530 and the fingerprint sensor 550. According to one embodiment, the illumination unit 530 may be disposed on a first printed circuit board 561 extending from the printed circuit unit 560, and the illumination unit 530 may be electrically connected to the first printed circuit board 561. According to an example embodiment, the fingerprint sensor 550 may be disposed on a second printed circuit board 562 extending from the printed circuit unit 560, and the fingerprint sensor 550 may be electrically connected to the second printed circuit board 562.

According to various embodiments, the illumination unit 530, which provides light, may be disposed between the first printed circuit board 561 and the reflective unit 540, and may be electrically connected to the first printed circuit board 561 so as to emit light. The first printed circuit board 561 may be a flexible printed circuit board. The illumination unit 530 may be, for example, an IR LED module, and may radiate light to one face of the reflective unit 540.

According to various embodiments, the reflective unit 540 may be disposed between the transparent window 503 and the illumination unit 530, and may provide the light received from the illumination unit 530 to the transparent window 503. The reflective unit 540 may include a film 541 disposed to face one face of the transparent window 503 and the plurality of reflective structures 542 formed to protrude toward the second (−Z) direction of the film 541. The film 541 may be disposed to face the bottom face 503b of the transparent window 503, and may be bonded to the bottom face 503b of the transparent window 503 using an adhesive or the like. The film 541 may include, for example, a polymer (PC or PET) having a predetermined refractive index.

According to various embodiments, the light incident into the reflective unit 540 may form a first path L1 including total and/or near total internal reflection of the incident light. For example, the first path L1 of the light of the reflective unit 540, to which the light of the illumination unit 530 is incident, may provide at least one total reflection, and through the total reflection, the path of light, which is provided from the illumination unit 530 and directed upward or rightward and upward, may be changed to be further tilted upward.

According to various embodiments, among a plurality of reflective structures 542, which forms the reflective unit 540, each reflective structure may be fabricated in a shape in which respective faces, which form the reflective unit 540, and the angles between the faces have different lengths and slopes, and may be made of a material that provides high transmissivity. For example, the film 541 and the plurality of reflective structures 542 may have a transmissivity of about 90% or more, and may be made of a material including transparent silicon. As another example, each of the plurality of reflective structures 542 may be configured with a prism having a triangular cross section. The specific configuration of each of the above reflective structures will be described in greater detail below with reference to FIGS. 7A and 7B.

According to various embodiments, the transparent window 503 may reflect the light transmitted from the reflective unit 540 to the top face 503a and/or the bottom face 503b of the transparent window 503, so that a second path L2 of light can be formed inside the transparent window 503. The light passing through the second path L2 of light may be transmitted to the fingerprint sensor 550 disposed below the active region of the transparent window 503 (the active region A of FIG. 2).

According to various embodiments, the light transmitted along the top face 503a and the bottom face 503b of the transparent window 503 may be directed to the fingerprint of the user who touches the active region A of the transparent window 503. The light is reflected by a ridge and/or a valley of the user's fingerprint, and the reflected light is able to reach the fingerprint sensor 550. For example, the user's fingerprint placed in an active region (active region A in FIG. 2) of the transparent window 503 has an irregular surface in the shape of a valley and/or a ridge, thereby being divided into a region, which is in contact with the transparent window 503 and an area which is not in contact with the transparent window 503. At this time, the light transmitted along the second path L2 is reflected in the region of the user's fingerprint, which is not in contact with the transparent window 503, but in the region of the user's fingerprint, which is in contact with the transparent window 503, a part of the light may be absorbed into the user's fingerprint and the remaining part of the light may be scattered and reflected. Accordingly, the light incident on the transparent window 503, which is not in contact with the user's fingerprint, is totally reflected and travels toward the fingerprint sensor 550. However, the light incident on the transparent window 503, which is in contact with the user's fingerprint, is absorbed, refracted, or scattered so that the light cannot proceed to the fingerprint sensor 550.

According to various embodiments, the fingerprint sensor 550 may be disposed under the transparent window 503, and may receive the light provided to the transparent window 503 so as to sense fingerprint information of the user. The fingerprint sensor 550 may be disposed on the top face of the second printed circuit board 562, and may be electrically connected to the second printed circuit board 562. The substantially entire area of the fingerprint sensor 550 may overlap with the display device 520 when viewed from a point above the transparent cover 503. As another example, the substantially entire area of the fingerprint sensor 550 may overlap with the touch sensor and/or the pressure sensor (not illustrated). The fingerprint sensor 550 may include at least one fingerprint electrode and a support plate (not illustrated), and the support plate may be a polymer film, such as PET, or a glass substrate.

According to various embodiments, the fingerprint sensor 550 may focus the light reflected by the transparent window 503, and a lens having a short focal length may be used in order to miniaturize an optical scanning device. As another example, the fingerprint sensor 503 may include an array lens to correspond to the size of an image to be scanned, and the array lens may be formed in a matrix structure.

According to various embodiments, the display device 520 disposed between the transparent window 503 and the fingerprint sensor 550 may include a dielectric layer 521 and an optical layer 522. The dielectric layer 521 may be disposed to be in contact with the transparent window 503 and may include, for example, silicon, air, foam, a membrane, an Optical Clear Adhesive (OCA), sponge, rubber, ink, or a polymer (PC or PET). The optical layer 522 may be disposed under the dielectric layer 521.

According to various embodiments, the optical layer 522 transmits an image output from the display panel 523, and may be stacked on the display panel 523 as at least one layer. For example, the optical layer 522 may include an optical compensation film or the like for correcting a phase difference or the like of an image output from the display panel 523. As another example, when the display device 520 has a touch screen function, an indium-tin oxide (ITO) film for sensing the user's touch position or the like may also correspond to the optical layer 522.

According to various embodiments, the optical member 522 may include an optical compensation film (e.g., a polarizing film). In the optical compensation film, Tri-Acetyl Cellulose (TAC) films are respectively attached to the opposite surfaces of a polyvinyl alcohol (PVA) film, which provides a polarizing function, and the surface side TAC film may be protected by a surface coating layer.

According to various embodiments, a film layer 524 may be disposed between the transparent window 503 and the second printed circuit board 562 so as to suppresses light scattering. The film layer 524 may control the light to be directed toward the transparent window 503 so as to suppress the scattering of light emitted to the outside (e.g., in the rearward direction of the electronic device 500). However, one region of the film layer 524 may be opened in order to provide light transmitted from the transparent window 503 to the fingerprint sensor 550. For example, the film layer 524 may be opened in a region corresponding to the fingerprint sensor 550 so as to provide a space, which allows the light reflected from one region of the transparent window 503 to reach the fingerprint sensor 550.

According to various embodiments, the reflective unit 540 and the illumination unit 530 may be positioned below the first region S1 of the transparent window 503, and the fingerprint sensor 550 may be positioned below the second region S2 of the transparent window 503. The first region S1 and the second region S2 are adjacent to each other, and the transparent window 503 may form the second path L2 of the light generated from the illumination unit 530 in the first region S1 and the second region S2. According to one embodiment, the second path L2 may be formed by repeated total reflection of light on the top and bottom faces of the transparent window 503.

Figure 6A:
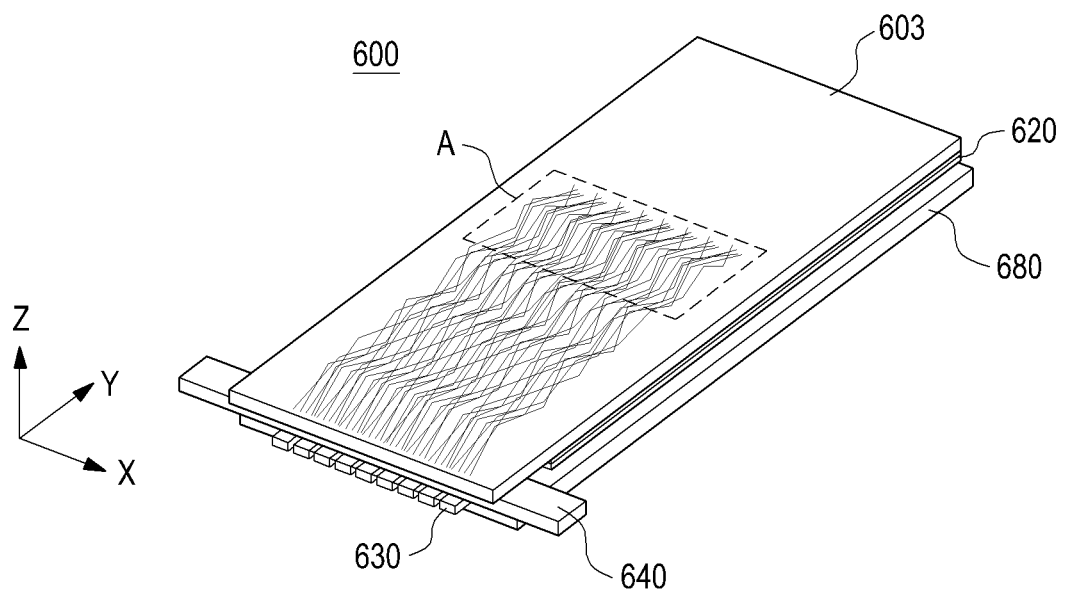
FIG. 6A is a perspective view in which the paths of light provided in a region of an example electronic device are viewed from above according to various example embodiments of the present disclosure.
Figure 6B:
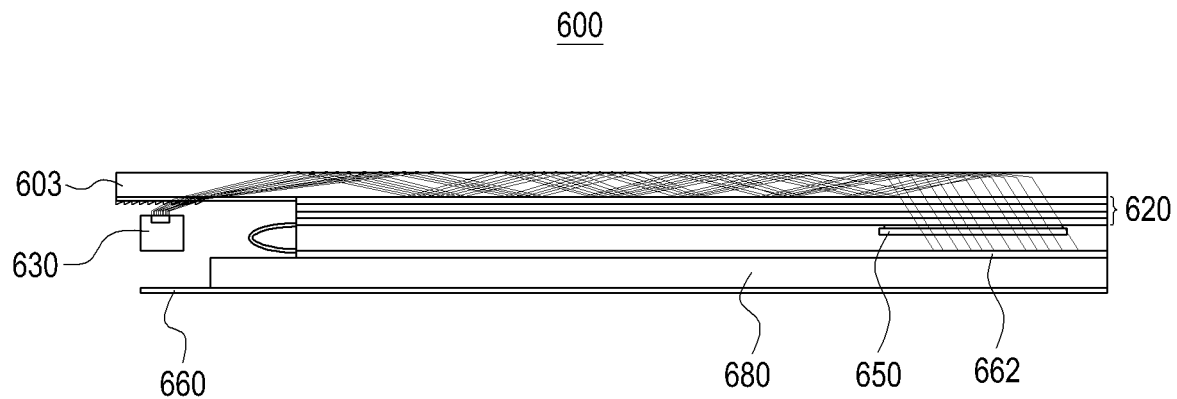
FIG. 6B is a cross-sectional view in which the paths of light provided in a region of an example electronic device are illustrated according to various example embodiments of the present disclosure.

FIG. 6A is a perspective view of a path of light provided in a region of the electronic device 600, in which the path of light is viewed from an upper side, and FIG. 6B is a cross-sectional view illustrating a path of light provided in a region of the electronic device 600 according to various example embodiments of the present disclosure. The transparent window 603, the display device 620, and the printed circuit unit 660 of the electronic device 600 illustrated in FIGS. 6A and 6B may correspond to the transparent window 503, the display device 520, and the printed circuit unit 560 of FIG. 5.

Referring to FIGS. 6A and 6B, the electronic device 600 may include a transparent window 603 made, for example, and without limitation, of glass, and may also include a reflective unit 640, a display device 620 or illumination unit 630 and a printed circuit unit 660, which are disposed under the transparent window 603. According to various embodiments, the illumination unit 630 may be provided in a plural number in the X-axis direction under a region of the transparent window 603, and the plurality of illumination units 630 may be arranged in a row. For example, the illumination unit 630 may be formed of an IR LED, and a plurality of illumination units 630 may be arranged in a row. The plurality of illumination units 630 may be arranged so as to illuminate light in an illumination direction from the lower side to the upper side so that a plurality of light beams can be incident toward the reflective unit 640. However, the number and/or type of the illumination units 630 are not limited to the above-described embodiment, and various numbers and positions of the illumination units 630 may be changed for effective light transmission and reflection.

According to various embodiments, the reflective unit 640 may be designed to have a size corresponding to the length in which the plurality of illumination units 630 is arranged such that the light emitted from the plurality of illumination units 630 may be incident on the reflective unit 640. The path of the plurality of light beams incident on the reflective unit 640 may deliver the plurality of light beams, which is totally reflected on the inclined face of the reflective structure of the reflective unit 640, to the transparent window 603. The reflective unit 640 may minimize and/or reduce the reflection angle such that the light incident from the illumination unit 630 may be reflected to a specific region of the transparent window 603, and the minimized reflection angle may increase the efficiency of the light that is totally and/or near totally reflected to the transparent window 603. The fingerprint sensor 650 may be disposed below the display 620 and be connected to the second printed circuit board 662 (e.g., similarly to the configuration shown in FIG. 5, elements 550 and 562).

Figure 7A:
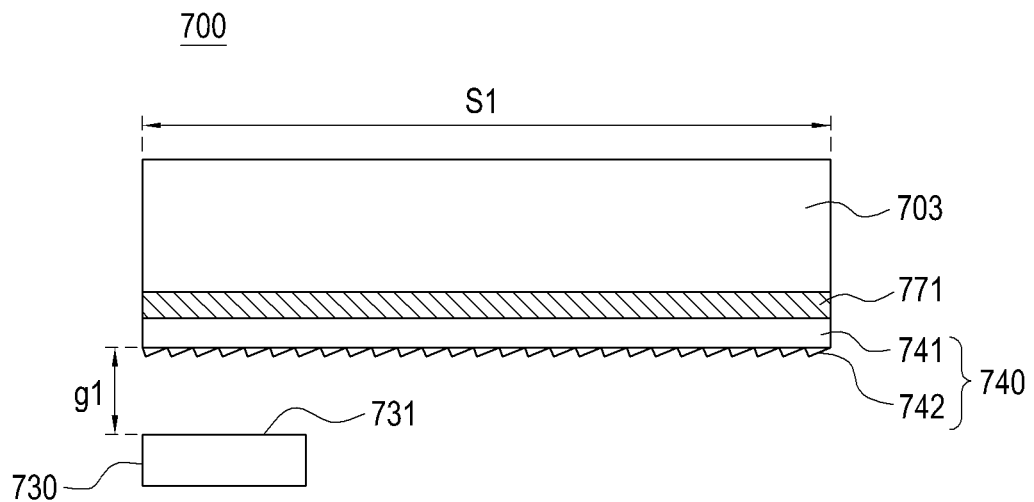
FIG. 7A is a cross-sectional view illustrating a mutual arrangement relationship of an example illumination unit and an example reflective unit according to various example embodiments of the present disclosure.
Figure 7B:
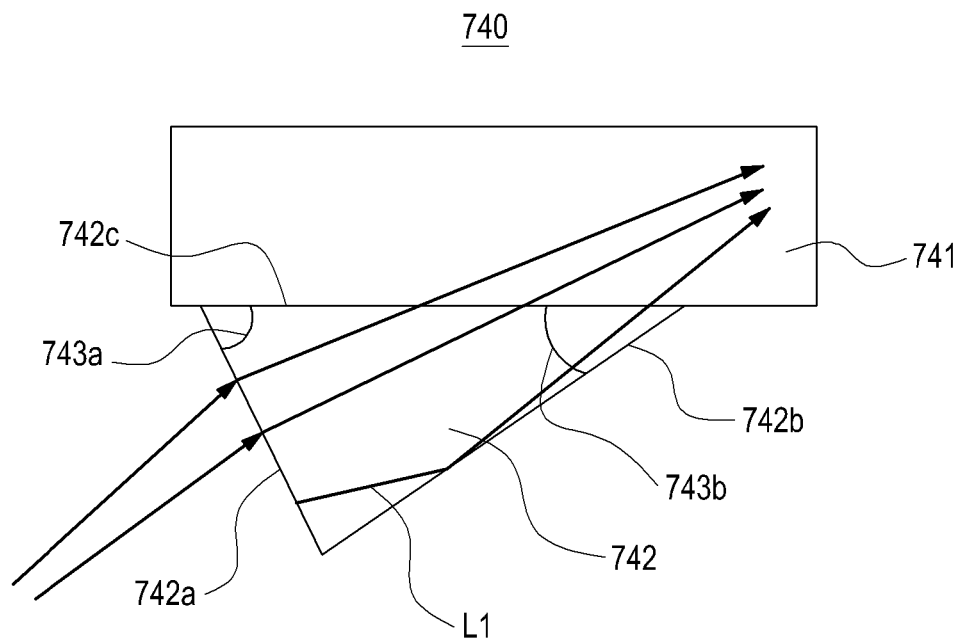
FIG. 7B is an enlarged view of one reflective structure of the reflective unit illustrated in FIG. 7A.

FIG. 7A is a cross-sectional view illustrating an example mutual arrangement relationship of an illumination unit 730 and a reflective unit 740 according to various example embodiments of the present disclosure. FIG. 7B is an enlarged view of one reflective structure of the reflective unit 740 of FIG. 7A.

A transparent window 703, the illumination unit 730, and the reflective unit 740 of the electronic device illustrated in FIGS. 7A and 7B may correspond to a part or all of the structure of the transparent window 503, the illumination unit 530, and the reflective unit 540 of FIG. 5.

Referring to FIGS. 7A and 7B, the reflective unit 740 and the illumination unit 730 may be disposed to face each other under the transparent window 703. According to various embodiments, the reflective unit 740 may include a plurality of reflective structures facing the top face 731 of the illumination unit 730, and each reflective structure 742 of the plurality of reflective structures may include a plurality of faces.

According to various embodiments, each of the plurality of reflective structures 742 may include a first face 742a on which light emitted from the illumination unit 730 is incident, and a second face 742b, which forms an inclined face with respect to the first face 742a and totally and/or near totally reflects the light transmitted from the illumination unit 730. The second face 742b may be an inclined face forming an acute angle with respect to the first face 742a. In addition, a third face 742c may be included that is arranged to face the film 741 and forms an inclined face with respect to the first face 742a and the second face 742b. For example, the space of the reflective unit 740 surrounded by the first, second, and third faces 742a, 742b, and 742c may form a first path L1 of the light.

According to various embodiments, the first face 742a and the second face 742b may be disposed above the illumination unit 730, and may form an incline face with respect to the top face 731 of the illumination unit 730.

According to various embodiments, the electronic device may implement various distance designs between the illumination unit 730 and the reflective unit 740 for effective light efficiency. The illumination unit 730 and the reflective unit 740 may be designed so as to be spaced apart from each other by a predetermined distance g1. The spaced predetermined distance g1 may have a refractive index different from the refractive index of the inside of the reflective structure 742 and/or the refractive index of the inside of the film 741. For example, the predetermined gap may be an air gap, and the material may include a material having a transmissivity of about 90% or more or a refractive index of about 1.5.

According to various embodiments, the third face 742c may transmit light that has passed through the first face 742a or light that has been reflected to the second face 742b so as to cause the light to be incident on the transparent window 703 through the film 741. The third face 742c may be disposed to face the film 741 in parallel therewith and may have a length different from those of the first face 742a and the second face 742b. As another example, the third face 742c is disposed to be in contact with the bottom face of the film 741, and may be bonded to the bottom face of the film 741 using an adhesive or the like.

According to various embodiments, the reflective structures 742 may be configured in triangular shapes, the cross sections of which have different angles. However, the reflective unit 740 may provide a space for the first path L1 of the light in one form via the first face 742a, the second face 742b, and the third face 445, but the present disclosure is not limited thereto. The space may be provided in various forms depending on the internal structure of the electronic device 700, or may also be formed as one face.

According to various embodiments, the plurality of reflective structures of the reflective unit 740 may be configured with prisms. The cross section of each of the plurality of reflective structures 742 may have a triangular shape, and the triangular reflective structures 742 may be designed to have various angles in order to achieve effective optical efficiency.

Table 1 below represents light efficiencies according to the angles of the respective reflective structures 742 in comparison.

TABLE 1

| Refractive Index of Film | | Angle of Pattern | | Amount of Light Incident on Sensor (Result of Optical Interpretation) | | Remarks |
| --- | --- | --- | --- | --- | --- | --- |
| | | | | Amount of Incident Light | | Optical efficiency compared to |
| Film | Pattern | Left | Right | (W) | (UW) | Reference |
| 1.57 | 1.55 | 45 | 45 | 2.56E−09 | 0.0 | 0.0% |
| 1.57 | 1.55 | 60 | 30 | 4.58E−06 | 4.6 | 33% |
| 1.57 | 1.55 | 65 | 25 | 1.09E−05 | 10.9 | 78% |
| 1.57 | 1.55 | 70 | 20 | 1.50E−05 | 15.0 | 107% |
| 1.57 | 1.55 | 75 | 15 | 1.16E−05 | 11.6 | 83% |
| 1.57 | 1.55 | 80 | 10 | 7.74E−06 | 6.7 | 48% |

Referring to Table 1, the refractive indexes of the film 741 and each reflective structure 742 of the plurality of reflective structures in the reflective unit 740 may be set to be different from each other for the purpose of the total reflection within the transparent window 703. For example, the refractive index of the film 741 may be about 1.57, and the refractive index of each of the plurality of reflective structures 742 may be about 1.55.

According to various embodiments, with reference to the third face 742c disposed in parallel with the film 741, each of the plurality of reflective structures 742 may form a first angle 743a with the first face 742a, and may form a second angle, which is different from the first angle 743a, with the second face 742b. The control of the first angle 743a may control the angle at which the light emitted from the illumination unit 730 enters the reflective structure 742 configured with a prism, and the control of the second angle 743b may control the angle at which the light, which has entered the reflective structure 742 configured with a prism, enters the film 741 from the reflective structure 742 configured with the prism.

Referring to Table 1, it can be seen that high optical efficiencies are exhibited when the first angle 743a is set to a value between 65 and 75 degrees and the second angle 743b is set to a value between 15 and 25 degrees. In addition, it can be seen that when the first angle 743a is set to about 70 degrees and the second angle 743b is set to about 20 degrees, the optical efficiency is improved by about 107% compared to the reference.

According to various embodiments, by adjusting the first angle 743a and the second angle 743b of each of the reflective structures 742 to optimal angles, it is possible to cause totally reflected light to enter the inside of the transparent window 703, and it is possible to secure assemblability of the electronic device and to implement a slim structure with repeated reflective structures and the configuration of miniaturized reflective structures for total reflection.

Referring again to FIG. 7A, a first dielectric layer 771 may be disposed between the transparent window 703 and the reflective unit 740. The first dielectric layer 771 may be disposed to be in contact with the lower portion of the transparent window 703 so as to cover the entire area of the first region S1 of the transparent window 703, and may have a refractive index different from that of the transparent window 703. For example, the first dielectric layer 771 may include silicon, air, foam, a membrane, an Optical Clear Adhesive (OCA), sponge, rubber, ink, and a polymer (PC or PET). As another example, the first dielectric layer 771 may have a relatively larger refractive index than that of the transparent window 703. The refractive index of the first dielectric layer 771 may be in the range of, for example, about 1.5 to 1.6.

According to various embodiments, the light emitted from the illumination unit 730 may enter the first dielectric layer 771 through the first path of the light in the reflective unit 740 (the first path L1 in FIG. 7B), and light, the path of which is changed depending on the refractive index of the first dielectric layer 771, may be transmitted to the transparent window 703.

Figure 8:
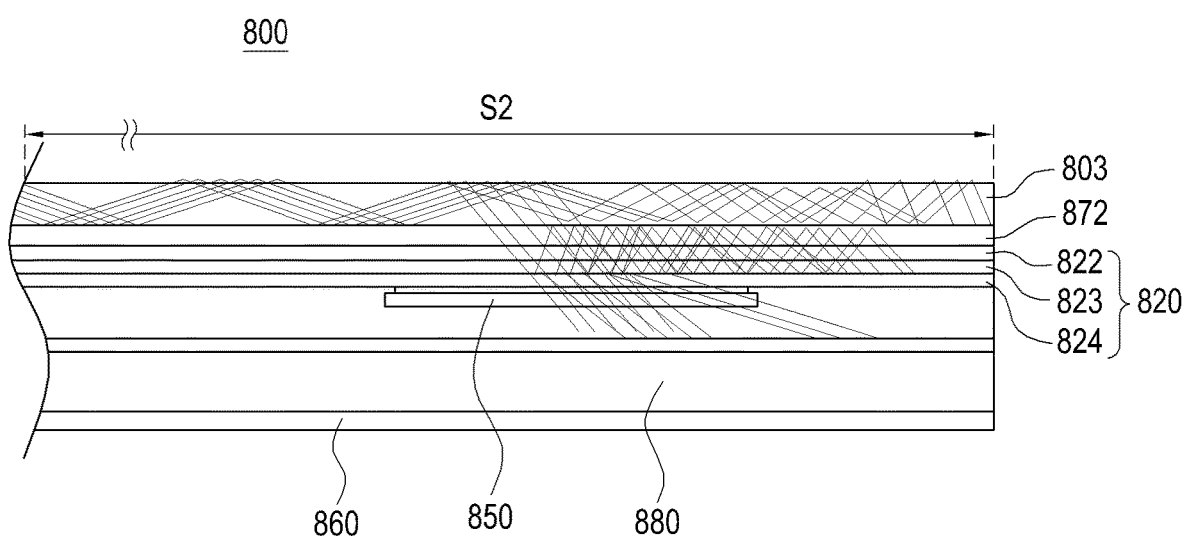
FIG. 8 is a cross-sectional view illustrating an arrangement relationship between a dielectric layer between a transparent window and a reflective unit of an example electronic device and a dielectric layer between the transparent window and the fingerprint sensor, according to various example embodiments of the present disclosure.

FIG. 8 is a cross-sectional view illustrating an example arrangement relationship of a second dielectric layer 872 disposed between a transparent window 803 and a fingerprint sensor 850 of an electronic device 800 according to various example embodiments of the present disclosure. The transparent window 803, the display device 820, and the second dielectric layer 872 of the electronic device 800 illustrated in FIG. 8 may correspond to a part or all of the structure of the transparent window 503 and the display device 520 of FIG. 5. Additionally, the printed circuit unit 860 and support member 880 illustrated in FIG. 8 may correspond to all or part of the printed circuit unit 560 and support member 580 illustrated in FIG. 5.

Referring to FIG. 8, a second dielectric layer 872 may be disposed between the transparent window 803 and the fingerprint sensor 850. The second dielectric layer 872 may be disposed to be bonded to the lower portion of the transparent window 803 so as to cover the entire area of the second region S2 of the transparent window 803, and may have a refractive index different from that of the transparent window 803. For example, the second dielectric layer 872 may include silicon, air, foam, a membrane, an Optical Clear Adhesive (OCA), sponge, rubber, ink, and a polymer (PC or PET). As another example, the second dielectric layer 872 may have a relatively larger refractive index than that of the transparent window 803. The refractive index of the second dielectric layer 872 may be in the range of, for example, about 1.4 to 1.5.

According to various embodiments, the second dielectric layer 872 may be stacked as at least one layer, and an optical layer 822, a display panel 823, and a film layer 824 of the display device 820 may be sequentially stacked under the second dielectric layer 872.

According to various embodiments, the light having the second path L2 formed in the transparent window 803 may be transmitted to the fingerprint sensor 850 while the path of the light is changed depending on the refractive index of the second dielectric layer 872.

According to various embodiments, the first dielectric layer 771 illustrated in FIG. 7A may be used as an adhesive for the transparent window 803 and the reflective unit 740, and the second dielectric layer 872 may be used as an adhesive for the transparent window 803 and the optical layer 822. As another example, the first dielectric layer 771 and the second dielectric layer 872 may have different refractive indices. Material having various refractive indexes may be used such that, in the first region S1, light can efficiently pass through the inside of the transparent window 803 and, in the second region S2, the light of the transparent window 803 can be sensed by the fingerprint sensor 850.

The following Table 2 represents light efficiencies according to the refractive indexes of the first dielectric layer 771 of FIG. 7B and the second dielectric layer 872 of FIG. 8.

TABLE 2

| Refractive Index of T-OCA | Refractive Index of C-OCA | Refractive Index of Film | | Amount of Light Incident on Sensor (Result of Optical Interpretation) | | Remarks |
|---|---|---|---|---|---|---|
| | | | | Amount of Incident Light | | Optical efficiency compared to |
| T-OCA | C-OCA | Film | Pattern | (W) | (UW) | Reference |
| 1.41 | 1.512 | 1.57 (Available PET Film) | 1.55 | 1.50E−05 | 15.0 | 107% |
| | | | 1.53 | 1.23E−05 | 12.3 | 88% |
| | | | 1.51 | 7.86E−06 | 7.9 | 56% |
| | | 1.57 | 1.57 | 1.53E−05 | 15.3 | 109% |
| | | 1.55 | (High Refractive OCR) | 1.57E−05 | 15.7 | 112% |
| | | 1.53 | | 1.57E−05 | 15.7 | 112% |
| 1.47 | 1.512 | 1.57 | 1.55 | 1.52E−06 | 1.5 | 11% |
| | | | 1.53 | 1.59E−07 | 0.2 | 1% |
| | | | 1.51 | 4.48E−09 | 0.0 | 0% |

Referring to Table 2, the optimum optical efficiency may be checked by changing the refractive index of the second dielectric layer 872 (e.g., T-OCA) after setting the refractive index of the first dielectric layer 771 (e.g., C-OCA). For example, when the refractive index of the first dielectric layer 771 is set to about 1.512 and the refractive index of the second dielectric layer 872 is set to be about 1.41, it can be seen that the amount of light incident on the fingerprint sensor is exhibited relatively high compared to a case in which the second dielectric layer 872 has a refractive index of a different numerical value.

Further, when the refractive index of the second dielectric layer 872 is set to about 1.41 and the refractive index of the plurality of reflective structures is set to about 1.57, the amount of light incident on the fingerprint sensor exhibits a value of at least 109% or more compared to the reference.

According to various embodiments, by adjusting the refractive indexes of the first dielectric layer 771 disposed to face the reflective unit 740 and the second dielectric layer 872 disposed to face the fingerprint sensor 850, it is possible to efficiently increase the amount of light incident on the fingerprint sensor 850 through the inner portions of the transparent windows 703 and 803.

The following Table 3 represents light efficiencies according to the refractive indexes of the first dielectric layer 771 of FIG. 7B, the second dielectric layer 872 of FIG. 8, and the refractive index of the film 741.

TABLE 3

| Refractive Index of T-OCA | Refractive Index of C-OCA | Refractive Index of Film | | Amount of Light Incident on Sensor (Result of Optical Interpretation) | | Remarks |
|---|---|---|---|---|---|---|
| T-OCA | C-OCA | Film | Pattern | Amount of Incident Light (W) | (UM) | Optical efficiency compared to Reference |
| 1.41 | 1.512 | 1.65 | 1.55 | 1.18E−05 | 11.8 | 84% |
| 1.41 | 1.512 | 1.65 | 1.53 | 1.02E−05 | 10.2 | 73% |
| 1.41 | 1.512 | 1.63 | 1.55 | 1.37E−05 | 13.7 | 98% |
| 1.41 | 1.512 | 1.63 | 1.53 | 1.16E−05 | 11.6 | 83% |
| 1.41 | 1.512 | — | 1.55 | 1.56E−05 | 15.6 | 112% |
| 1.41 | 1.512 | — | 1.53 | 1.31E−05 | 13.1 | 94% |

Referring to Table 3, the optimum optical efficiency may be checked by changing the refractive index of the film 740 while maintaining the refractive index of the first dielectric layer 771 (e.g., C-OCA) and the refractive index of the second dielectric layer 872 (e.g., T-OCA) at set values of optimum states in Table 1. For example, when the refractive index of the first dielectric layer 771 is set to about 1.512, the refractive index of the second dielectric layer 872 is set to about 1.41, and the refractive index of the film 740 is set to about 1.63, it can be seen that the amount of light incident on the fingerprint sensor 850 is exhibited relatively high compared to a case in which the film has a refractive index of a different numerical value.

According to various embodiments, the amount of light incident on the fingerprint sensor through the inner portion of the transparent window 703 may be efficiently increased by adjusting the refractive index of the film 741 of the reflective unit 740. Further, by adopting the plurality of repeated reflective structures and miniaturizing the reflective structures, it is possible to secure the assemblability of the electronic device and to implement a slim structure.

Figure 9A:
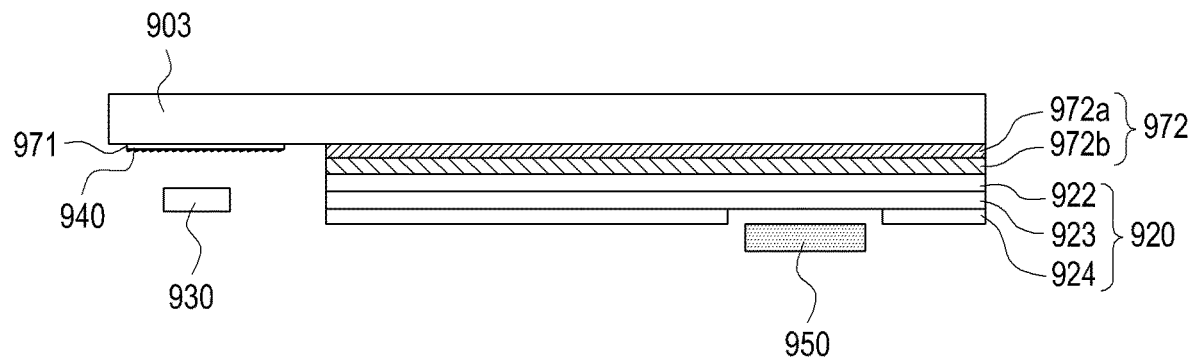
FIGS. 9A and 9B are cross-sectional views illustrating an example arrangement relationship of a second dielectric layer between a transparent window and a fingerprint sensor according to various example embodiments of the present disclosure.
Figure 9B:
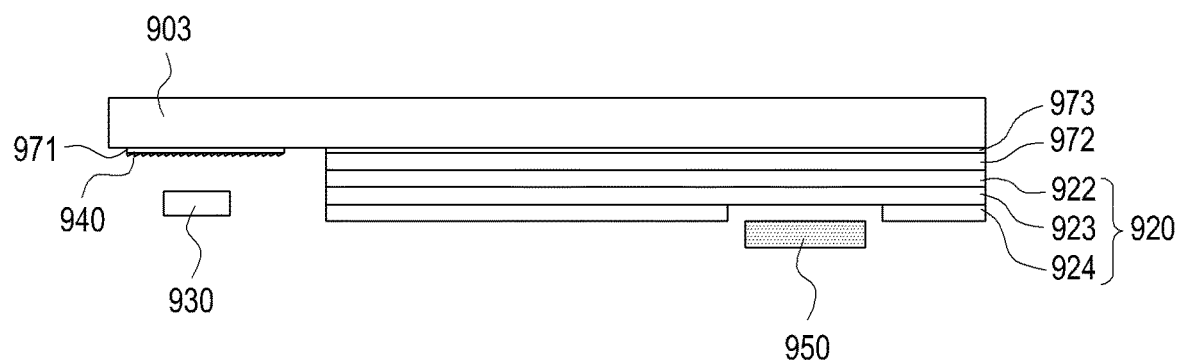

FIGS. 9A and 9B are cross-sectional views illustrating an example arrangement relationship of a second dielectric layer 972 between a transparent window 903 and a fingerprint sensor 950 according to various example embodiments of the present disclosure. A transparent window 903, illumination unit 930, a reflective unit 940, and a second dielectric layer 972 of the electronic device 900 illustrated in FIGS. 9A and 9B may correspond to the transparent window 703 or 803, the illumination unit 730, the reflective unit 740, the first dielectric layer 771 or the second dielectric layer 872 of FIGS. 7A and 8.

Referring to FIGS. 9A and 9B, the electronic device 900 may include a first dielectric layer 971 for bonding the transparent window 903 and the reflective unit 940 to each other, and a second dielectric layer 972 for bonding the transparent window 903 and the display device 920 to each other.

According to various embodiments, the second dielectric layer 972 may be formed in a plurality of layers 972a, 972b, which may be arranged to have different refractive indexes, respectively, so as to adjust the reflection and/or refraction of light transmitted from the transparent window 903.

Referring to FIG. 9A, the second dielectric layer 972, an optical layer 922, a display panel 923, a film layer 924, and a fingerprint sensor 950 may be sequentially arranged from the transparent window 903. The second dielectric layer 972 may be composed of two layers, and the film layer 924 may be opened in a region corresponding to the fingerprint sensor 950 so as to provide a space which enables light reflected from a region of the transparent window 903 to reach the fingerprint sensor 950.

According to various embodiments, the second dielectric layer 972 may have two adhesive layers 972a and 972b, which are disposed to face each other between the transparent window 903 and the display panel 923. For example, the second dielectric layer 972 may include a first adhesive layer 972a disposed to be in contact with the transparent window 903 and a second adhesive layer 972b disposed between the first adhesive layer 972a and the optical layer 922 to be in contact with the first adhesive layer 972a and the optical layer 922.

According to various embodiments, the first adhesive layer 972a and the second adhesive layer 972b may be formed of a combination of adhesives having different refractive indexes. The first adhesive layer 972a and the second adhesive layer 972b may have refractive indexes smaller than that of the transparent window 903. As another example, the first adhesive layer 972a may have a refractive index smaller than that of the second adhesive layer 972b. For example, the first adhesive layer 972a may have a refractive index in the range of about 1.4 to 1.45, and the second adhesive layer 972b may have a refractive index in the range of about 1.47 to 1.5.

Referring to FIG. 9B, a coating layer 973, the second dielectric layer 972, the optical layer 922, the display panel 923, the film layer 924, and the fingerprint sensor 950 may be sequentially arranged from the transparent window 903. The film layer 924 may be opened in a region corresponding to the fingerprint sensor 950 so as to provide a space which enables light reflected from a region of the transparent window to reach the fingerprint sensor 950.

According to various embodiments, the coating layer 973 and the second dielectric layer 972 may be disposed to face each other between the transparent window 903 and the display panel 923. For example, the second dielectric layer 972 may include the coating layer 973 disposed to be in contact with the transparent window 903 and the second dielectric layer 972 disposed between the coating layer 973 and the optical layer 922 to be in contact with the coating layer 973 and the optical layer 922.

According to various embodiments, the coating layer 973 and the second dielectric layer 972 may be formed of a combination of adhesives having different refractive indexes. The coating layer 973 and the second dielectric layer 972 may have refractive indexes smaller than that of the transparent window 903. As another example, the coating layer 973 may have a refractive index smaller than that of the second dielectric layer 972. For example, the coating layer 973 may have a refractive index in the range of about 1.4 to 1.45, and the second dielectric layer 972 may have a refractive index in the range of about 1.47 to 1.5.

According to various embodiments, the light provided from the transparent window 903 may be totally reflected depending on the magnitude relationships of the refractive indexes of the transparent window 903, the coating layer 973, and the second dielectric layer 972.

Figure 10:
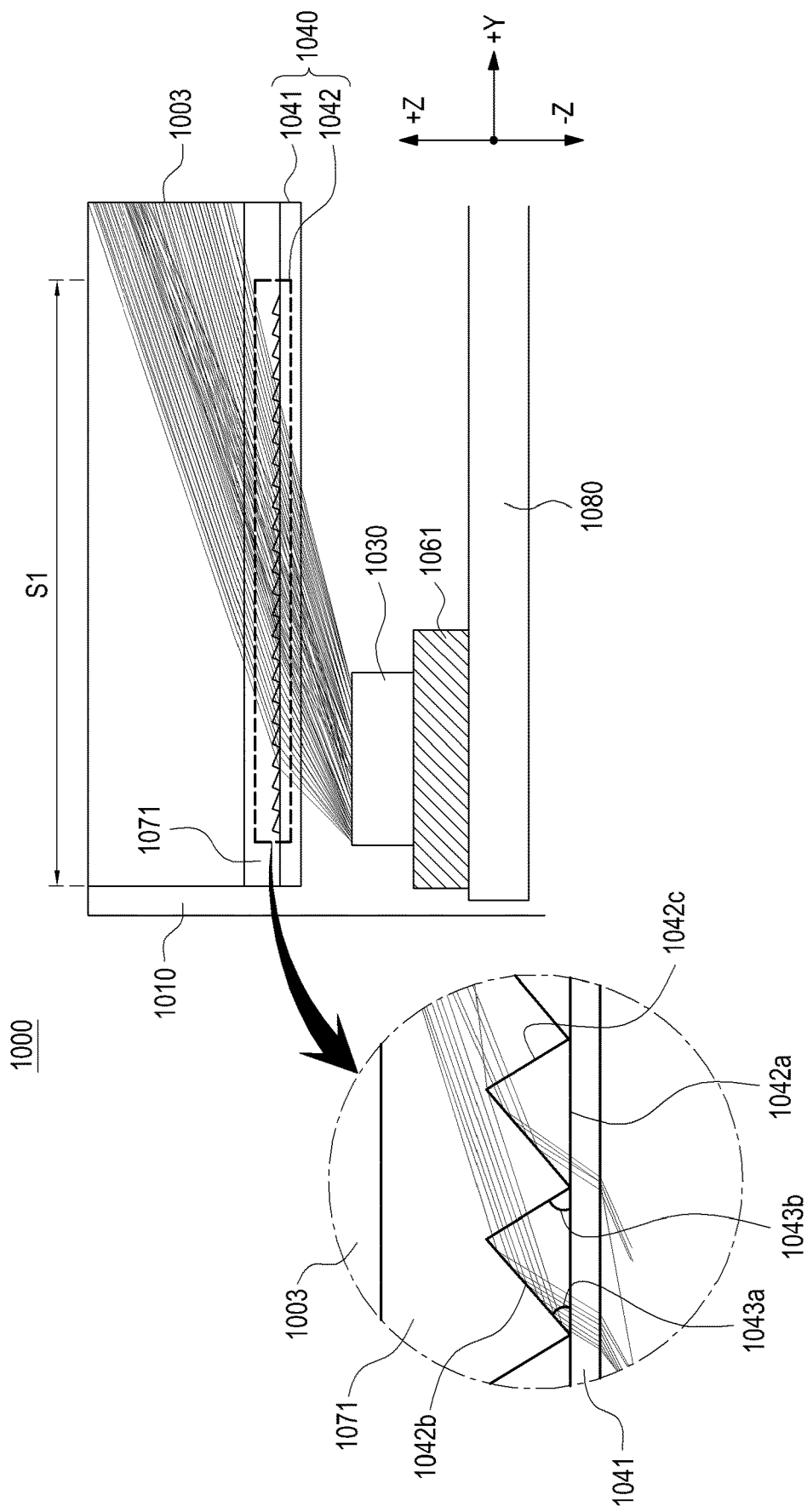
FIG. 10 is a cross-sectional view illustrating example structures of an illumination unit and a reflective unit of an example electronic device in which the reflective unit is enlarged according to various embodiments of the present disclosure.

FIG. 10 is a cross-sectional view illustrating example structures of an illumination unit 1030 and a reflective unit 1040 of the electronic device 1000 according to various example embodiments of the present disclosure, in which the reflective unit 1040 is enlarged. A transparent window 1003, the illumination unit 1030, and the reflective unit 1040 of an electronic device 1000 illustrated in FIG. 10 may correspond to a part or all of the structure of the transparent window 503, the illumination unit 530, and the reflective unit 540 of FIG. 5.

Referring to FIG. 10, the electronic device 1000 may include: a housing 1010; the transparent window 1003, which forms the top face of the housing 1010; the illumination unit 1030, which is disposed inside the housing 1010 and provides light; the reflective unit 1040, which reflects the light provided from the illumination unit 1030 so as to transmit the reflected light to the transparent window 1003; and a fingerprint sensor (the fingerprint sensor 550 of FIG. 5).

According to various embodiments, in the electronic device 1000, the transparent window 1003 may be positioned on the front face of the housing 1010 so as to protect the display device from the external environment. According to various embodiments, the housing 1010 may include a support member 1080 that supports the illumination unit 1030 and/or a first printed circuit board 1061.

According to various embodiments, the illumination unit 1030, which provides light, may be disposed between the first printed circuit board 1061 and the reflective unit 1040, and may be electrically connected to the first printed circuit board 1061 so as to emit light. The first printed circuit board 1061 may be a flexible printed circuit board. The illumination unit 1030 may be, for example, an IR LED module, and may radiate light to one face of the reflective unit 1040.

According to various embodiments, a dielectric layer 1071 may be disposed between the transparent window 1003 and the reflective unit 1040. The dielectric layer 1071 may be disposed to be in contact with the lower portion of the transparent window 1003 so as to cover the entire area of a first region S1 of the transparent window 1003, and may have a refractive index different from that of the transparent window 1003.

According to various embodiments, the reflective unit 1040 may be disposed between the transparent window 1003 and the illumination unit 1030, and may provide the light received from the illumination unit 1030 to the transparent window 1003. The reflective unit 1040 may include a film 1041 disposed to face one face of the transparent window 1003 and the plurality of reflective structures 1042 formed to protrude toward the first (+Z) direction of the film 1041. For example, each of the plurality of reflective structures may be arranged to be inserted into the dielectric layer 1071 and to be protected from the external environment.

According to various embodiments, the film 1041 may be disposed to face the bottom face of the transparent window 503, and may be bonded to the bottom face of the transparent window 503 using an adhesive or the like. The film 1041 may include, for example, a polymer (PC or PET) having a predetermined refractive index.

According to various embodiments, among a plurality of reflective structures, which forms the reflective unit 1040, each reflective structure is fabricated in a shape in which respective faces, which form the reflective unit 540, and the angles between the faces have different lengths and slopes, and may be made of a material that provides high transmissivity. As still another example, each reflective structure may include a prism having a triangular cross section.

According to various embodiments, each of the plurality of reflective structures 1042 may include a first face 1042a on which light emitted from the illumination unit 1030 is incident after passing through the film 1041, and a second face 1042b, which forms an inclined face with respect to the first face 1042a and totally reflects the light transmitted from the illumination unit 1030. The second face 1042b may be an inclined face forming an acute angle with respect to the first face 1042a. In addition, a third face 1042c may be included that is arranged to face the film 1041 and forms an inclined face with respect to the first face 1042a and the second face 1042b. For example, the space of the reflective unit 1040 surrounded by the first, second, and third faces 1042a, 1042b, and 1042c may form a path of light.

According to various embodiments, the third face 1042c may transmit light that has been reflected to the second face 1042b so as to cause the light to be incident on the transparent window 1003 through the dielectric layer 1071. The third face 1042c may be disposed to have a predetermined angle with respect to the film 1041, and may have a length different from those of the first face 1042a and the second face 1042b.

According to various embodiments, the respective reflective structures may be configured in triangular shapes, the cross sections of which have different angles. Although the reflective unit 1040 provides a space, which provides one path of the light in one form via the first face 1042a, the second face 1042b, and the third face 1042c, the present disclosure is not limited thereto. The space may be provided in various forms depending on the internal structure of the electronic device 1000, or may also be formed as one face.

According to various embodiments, the triangular reflective structure 1040 may be designed in various angles to achieve effective optical efficiency. For example, each of the plurality of reflective structures 1042 may be disposed to form a first angle 1043a with the second face 1042b with reference to the first face 1042a disposed parallel to the film 1041, and to form a second angle 1043b, which is different from the first angle 1043a, with the third face 1042c with reference to the first face 1042a. The control of the first angle 1043a may control the angle at which the light emitted from the illumination unit 1030 enters the reflective structure 1040 configured with the prism and the control of the second angle 1043b may control the angle at which the light, which has entered the reflective structure 1040 configured with the prism, enters the dielectric layer 1071 or the transparent window 1003 from the reflective structure 1040 configured with the prism.

It can be seen that high optical efficiencies are exhibited when the first angle 1043a is set to a value between 35 and 45 degrees and the second angle 1043b is set to a value between 45 and 55 degrees. For example, it can be seen that when the first angle 1043a is set to about 40 degrees and the second angle 1043b is set to about 60 degrees, the improved optical efficiency is exhibited.

According to various embodiments, by adjusting the first angle 1043a and the second angle 1043b of each of the reflective structures 1042 to optimal angles, it is possible to cause totally reflected light to enter the inside of the transparent window 1003, and it is possible to secure assemblability of the electronic device and to implement a slim structure with repeated reflective structures and the configuration of miniaturized reflective structures. In addition, according to the configuration of the plurality of reflective structures 1042 inserted into the inside of the dielectric layer, it is possible to prevent damage caused by an external impact.

Since the descriptions made with reference to FIG. 5 are applicable to the other detailed configurations of FIG. 10, descriptions of the other detailed configurations of FIG. 10 will be omitted.

Figure 11:
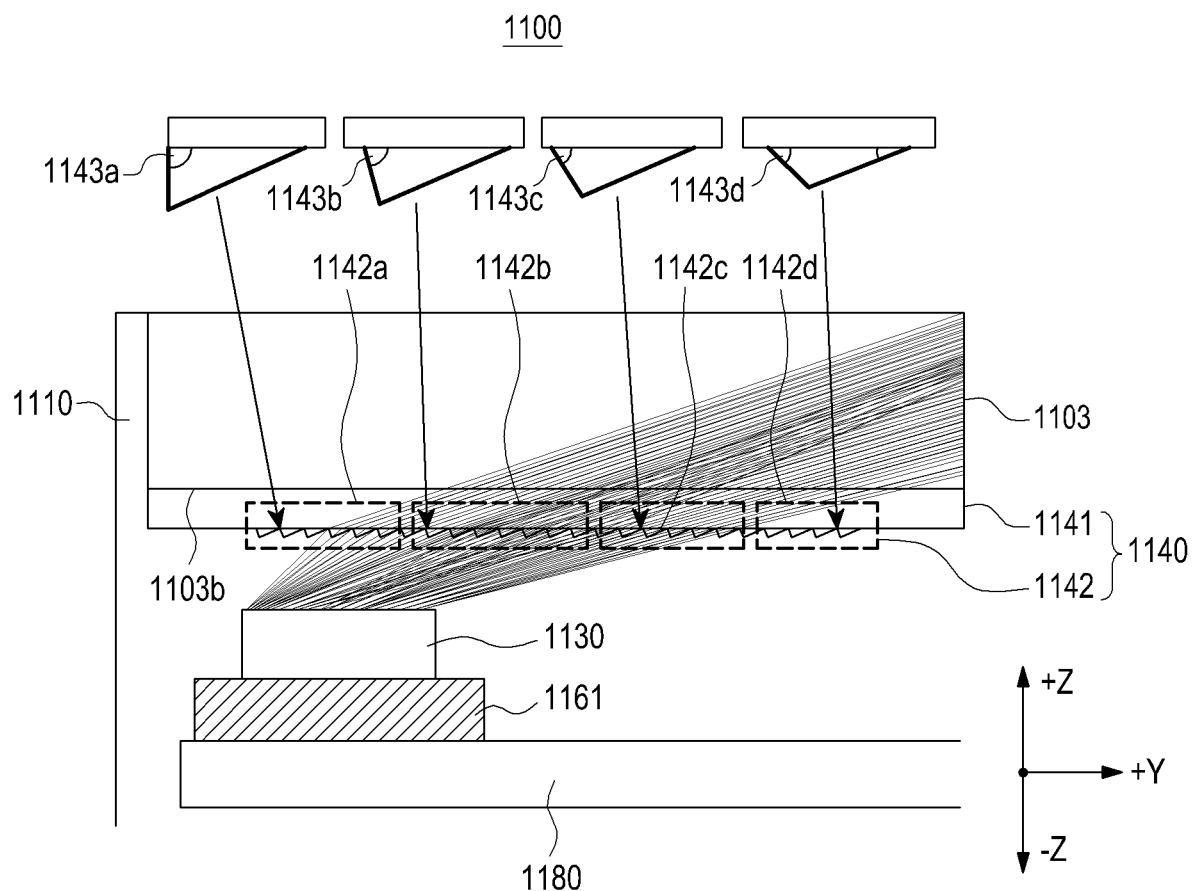
FIG. 11 is a cross-sectional view illustrating example structures of an illumination unit and a reflective unit of an example electronic device in which the reflective unit is enlarged according to various example embodiments of the present disclosure.

FIG. 11 is a cross-sectional view illustrating example structures of an illumination unit 1130 and a reflective unit 1140 of the electronic device 1100 according to various embodiments of the present disclosure, in which the reflective unit 1140 is enlarged. A transparent window 1103, the illumination unit 1130, and the reflective unit 1140 of an electronic device 1100 illustrated in FIG. 11 may correspond to a part or all of the structure of the transparent window 503, the illumination unit 530, and the reflective unit 540 of FIG. 5.

Referring to FIG. 11, the electronic device 1100 may include a housing 1110, the transparent window 1103, which forms the top face of the housing 1110, the illumination unit 1130, which is disposed inside the housing 1110 and provides light, the reflective unit 1140, which reflects the light provided from the illumination unit 1130 so as to transmit the reflected light to the transparent window 1103, and a fingerprint sensor (the fingerprint sensor 550 of FIG. 5).

According to various embodiments, in the electronic device 1100, the transparent window 1103 may be positioned on the front face of the housing 1110 so as to protect the display device from the external environment. According to various embodiments, the illumination unit 1130, which provides light, may be disposed between the first printed circuit board 1161 and the reflective unit 1140, and may be electrically connected to the first printed circuit board 1161 so as to emit light. The first printed circuit board 1161 may be a flexible printed circuit board. The illumination unit 1130 may be, for example, an IR LED module, and may radiate light to one face of the reflective unit 1140.

According to various embodiments, the reflective unit 1140 may be disposed between the transparent window 1103 and the illumination unit 1130, and may provide the light received from the illumination unit 1130 to the transparent window 1103. The reflective unit 1140 may include a film 1141 disposed to face one face of the transparent window 1103 and the plurality of reflective structures 1142 formed to protrude in the second (+Z) direction. The plurality of reflective structures 1142 may be formed as a group of reflective structures that form different inclined faces, respectively.

According to various embodiments, the film 1141 may be disposed to face the bottom face 1103b of the transparent window 1103, and may be bonded to the bottom face 1103b of the transparent window 1103 using an adhesive or the like. The film 1141 may include, for example, a polymer (PC or PET) having a predetermined refractive index.

According to various embodiments, among a plurality of reflective structures, which forms the reflective unit 1140, each reflective structure is fabricated in a shape in which respective faces, which form the reflective unit 540, and the angles between the faces have different lengths and slopes, and may be made of a material that provides high transmissivity. For example, the reflective structures may have a transmissivity of about 90% or more, and may be made of a material including transparent silicon. As still another example, each reflective structure may include a prism having a triangular cross section.

According to various embodiments, the plurality of reflective structures 1142 may be arranged to have sequentially variable angles from a region facing the illumination unit 1130 toward a fingerprint sensor direction (in the +Y axis direction). For example, at least one reflective structure of the first group 1142a disposed to face the one end of the illumination unit 1130 may be formed such that a face inclined with respect to the film 1103 has a first angle 1143a. Outside at least one reflective structure of the first group 1142a, at least one reflective structure of the second group 1142b, at least one reflective structure of the third group 1142c, and at least one reflective structure of the fourth group 1142d may be sequentially disposed. The inclined faces formed by the reflective structures of each group with the film 1103 may be formed to have a first angle 1143a, a second angle 1143b, a third angle 1143c, and a fourth angle 1143d that are sequentially reduced.

According to various embodiments, the groups forming the reflective structures may be formed in four or more patterns, the reflective structures of each group may be composed of one or more reflective structures, and the plurality of reflective structures in each group may also have sequentially variable angles in order to efficiently provide an amount of light.

According to various embodiments, the control of the sequentially variable angles may control the angle at which the light emitted from the illumination unit 1130 enters the reflective structures, each of which is configured with a prism. For example, the first angle 1143a of the at least one reflective structure of the first group 1142a may be set to about 87 degrees, the second angle 1142b of at least one reflective structure of the second group 1142b disposed outside the first group 1142a may be set to about 75 degrees, the third angle 1143c of the at least one reflective structure of the third group 1142c may be set to about 70 degrees, and the fourth angle 1143d of the at least one reflective structure of the fourth group 1142d may be set to about 65 degrees.

Table 4 below is a table, which represents a comparison of the amount of light incident on a fingerprint sensor when reflective structures having a fixed angle are adopted and the amount of light incident on the fingerprint sensor when reflective structures having variable angles are adopted.

TABLE 4

| Item | Angle-fixed Pattern | Angle-variable Pattern | Remark |
| --- | --- | --- | --- |
| Amount of Light | 14.1 uW | 16.39 uW | |
| Amount of Light Compared to Reference | 100.7% | 117.0% | Improvement of amount of light: 16% |

Referring to Table 4, it can be seen that the structure in which the reflective unit 1140 having a variable angle is arranged has a relatively high optical efficiency compared to a structure in which the reflective unit having a fixed angle is arranged. For example, in the structure in which the reflective unit 1140 having a variable angle is disposed, the amount of light incident on the fingerprint sensor is improved by about 16% compared with a reference in which the reflective unit having a fixed angle is arranged.

According to various embodiments, the amount of light incident on the fingerprint sensor through the inside of the transparent window 1103 can be efficiently increased as the plurality of reflective structures in the reflective unit 1140 is adjusted to sequentially vary the angles, and with the plurality of repeated reflective structures and the miniaturization of the totally reflective structure, it is possible to secure the assemblability of the electronic device and to implement a slim structure.

Since the descriptions made with reference to FIG. 5 are applicable to the other detailed configurations of FIG. 11, descriptions of the other detailed configurations of FIG. 10 will be omitted.

According to an example embodiment of the present disclosure, an electronic device may include: a housing including a first face facing a first direction and a second face facing a second direction opposite the first direction, and further including a transparent window forming at least a portion of the first face; a display device disposed between the first face and the second face of the housing and configured to display information to an outside through the transparent window; an illumination unit comprising light emitting circuitry disposed inside the first face of the housing and configured to emit light toward the transparent window; a reflective unit comprising a light reflecting material disposed between the illumination unit and the transparent window, and including a plurality of reflective structures configured to reflect light emitted from the illumination unit toward the transparent window; and a biometric sensor disposed to face at least a portion of the transparent window and configured to sense light reflected on the transparent window.

According to an example embodiment of the present disclosure, a reflective unit may include a film disposed to face one face of the transparent window and the plurality of reflective structures protruding toward the second direction of the film.

According to an example embodiment of the present disclosure, the reflective unit may be disposed below a first region of the transparent window, and the biometric sensor may be disposed below a second region of the transparent window, wherein the second region of the transparent window is different from the first region of the transparent window.

According to an example embodiment of the present disclosure, a substantially entire area of the biometric sensor may overlap with the display when viewed from a position above the transparent window.

According to an example embodiment of the present disclosure, the reflective unit may be configured to provide a first path that guides light emitted from the illumination unit to be totally or mostly reflected within each of the plurality of reflective structures and to be directed toward the transparent window, and the transparent window may be configured to provide a second path that guides the light provided from the reflective unit to be reflected a plurality of times within the transparent window and to be guided toward the biometric sensor.

According to an example embodiment of the present disclosure, the biometric sensor may include a fingerprint sensor, and the light, which passes through the second path within the transparent window, may be reflected by a user's fingerprint to reach the fingerprint sensor, and the fingerprint sensor may be configured to sense biometric information of the user, who touches the second region of the transparent window.

According to an example embodiment of the present disclosure, each of the plurality of reflective structures of the reflective unit may include a first face on which light emitted from the illumination unit is incident and a second face that forms an inclined face with respect to the first face and totally or mostly reflects light transmitted through the first face.

According to an example embodiment of the present disclosure, a cross section of each of the reflective structures comprise a triangular prism, and, with reference to a third face disposed in parallel with the film, each of the reflective structures may form a first angle with the first face and may form a first angle, which is different from the second angle, with the second face.

According to an example embodiment of the present disclosure, the first angle may be in a range of 65 to 75 degrees, and the second angle may be in a range of 15 to 25 degrees.

According to an example embodiment of the present disclosure, the first face may have a length longer than a length the second face.

According to an example embodiment of the present disclosure, the electronic device may further include a first dielectric layer disposed between the transparent window and the reflective unit and having a refractive index between a refractive index of the reflective unit and a refractive index of the transparent window.

According to an example embodiment of the present disclosure, a reflective unit may include a film disposed to face one face of the transparent window and the plurality of reflective structures protruding toward the first direction of the film, and inserted into the first dielectric layer.

According to an example embodiment of the present disclosure, the plurality of reflective structures may comprise a plurality of groups each including at least one pattern, and the plurality of groups may be sequentially arranged from one region of the lower side of the transparent window.

According to an example embodiment of the present disclosure, a cross section of each of the reflective structures disposed in the plurality of groups comprises a triangular prism, and among the plurality of groups, an angle formed by a reflective structure within a first group with the transparent window may differ from an angle formed by a reflective structure within a group, which is different from the first group, with the transparent window.

According to an example embodiment of the present disclosure, angles, which are formed by the reflective structures within the plurality of sequentially arranged groups with the transparent window, may be sequentially reduced.

According to an example embodiment of the present disclosure, an electronic device may include: a housing including a transparent window exposed to an outside; a printed circuit unit comprising a printed circuit board disposed within the housing; a reflective unit comprising a light reflecting surfaces disposed between the transparent window and the printed circuit unit and including a plurality of reflective structures configured to transmit light emitted from the illumination unit electrically connected to the printed circuit unit to the transparent window; and a fingerprint sensor disposed between the transparent window and the printed circuit unit, the fingerprint sensor being electrically connected to at least a portion of the printed circuit unit and configured to sense light transmitted through the transparent window.

According to an example embodiment of the present disclosure, the reflective unit may include a film disposed to face one face of the transparent window and the plurality of reflective structures formed to protrude toward the second direction of the film. Each of the plurality of reflective structures may be configured as a triangular prism that forms different opposite angles disposed with reference to one face of the reflective unit.

According to an example embodiment of the present disclosure, the transparent window may totally or mostly reflect the light transmitted from the reflective unit with a top face or a lower face thereof so as to form a light path within the transparent window.

According to an example embodiment of the present disclosure, the electronic device may further include: a first dielectric layer disposed between the transparent window and the reflective unit and having a refractive index between a refractive index of the reflective unit and a refractive index of the transparent window; and a second dielectric layer disposed between the transparent window and the fingerprint sensor, and having a refractive index that is different from the refractive index of the first dielectric layer.

According to an example embodiment of the present disclosure, the second dielectric layer may comprise a plurality of different layers, which may have different refractive indexes or different transmissivities with respect to the light.

According to an example embodiment of the present disclosure, a film layer may be disposed between the transparent window and the printed circuit unit and is configured to suppress light scattering, and the film layer may be opened in a region corresponding to the fingerprint sensor to provide a space, which enables light reflected in one region of the transparent window to reach the fingerprint sensor.

While the present disclosure has been illustrated and described with reference to various example embodiments thereof, it will be understood by those skilled in the art that various changes in form and details may be made therein without departing from the spirit and scope of the present disclosure as defined by the appended claims.

What is claimed is:

1. An electronic device comprising:
a housing including a first face facing a first direction and a second face facing a second direction opposite the first direction, and further including a transparent window comprising at least a portion of the first face;
a display device disposed between the first face and the second face of the housing and configured to display information to an outside through the transparent window;
an illumination unit comprising light emitting circuitry disposed inside the housing and configured to emit light toward the transparent window;
a reflective unit comprising light reflecting surfaces disposed between the illumination unit and the transparent window, and including a plurality of reflective structures configured to reflect light emitted from the illumination unit toward the transparent window; and
a biometric sensor disposed to face at least a portion of the transparent window and configured to sense light reflected on the transparent window,
wherein the reflective unit includes a film disposed to face one face of the transparent window, and the plurality of reflective structures of the reflective unit protrude in a direction away from the transparent window.

2. The electronic device of claim 1, wherein the reflective unit is disposed below a first region of the transparent window, and
the biometric sensor is disposed below a second region of the transparent window, the second region of the transparent window being different from the first region of the transparent window.

3. The electronic device of claim 1, wherein a substantially entire area of the biometric sensor overlaps the display when viewed from a position above the transparent window.

4. The electronic device of claim 3, wherein the reflective unit is configured to provide a first path that guides light emitted from the illumination unit to be reflected within each of the plurality of reflective structures and to be directed toward the transparent window, and the transparent window is configured to provide a second path that guides the light provided from the reflective unit to be reflected a plurality of times within the transparent window and to be guided toward the biometric sensor.

5. The electronic device of claim 4, wherein the biometric sensor includes a fingerprint sensor, and
the light, which passes through the second path within the transparent window, is configured to be reflected by a user's fingerprint to reach the fingerprint sensor, and the fingerprint sensor is configured to sense biometric information of the user touching the second region of the transparent window.

6. The electronic device of claim 1, wherein each of the plurality of reflective structures of the reflective unit includes:
a first face configured to receive incident light from the illumination unit; and
a second face forming an inclined face with respect to the first face and is configured to reflect light transmitted through the first face.

7. The electronic device of claim 6, wherein each of the reflective structures includes a prism, and
each of the reflective structures forms a first angle with the first face and a third face disposed in parallel with the film and forms a second angle, which is different from the first angle, with the second face and the third face.

8. The electronic device of claim 7, wherein the first angle is in a range of 65 to 75 degrees, and the second angle is in a range of 15 to 25 degrees.

9. The electronic device of claim 7, wherein the first face has a length longer than a length of the second face.

10. The electronic device of claim 1, further comprising:
a first dielectric layer disposed between the transparent window and the reflective unit and having a refractive index between a refractive index of the reflective unit and a refractive index of the transparent window.

11. The electronic device of claim 10, wherein the reflective unit includes:
a film disposed to face one face of the transparent window; and
the plurality of reflective structures of the reflective unit protrude toward a first direction of the film, and are inserted into the first dielectric layer.

12. The electronic device of claim 3, wherein the plurality of reflective structures of the reflective unit comprises a plurality of groups each including at least one pattern, and
the plurality of groups is sequentially arranged from one region of the lower side of the transparent window.

13. The electronic device of claim 12, wherein a cross section of each of the reflective structures disposed in the plurality of groups is comprises a triangular prism, and
among the plurality of groups, an angle formed by a first surface of the reflective structure within a first group with the transparent window differs from an angle formed by a first surface of the reflective structure within another group different from the first group with the transparent window.

14. The electronic device of claim 12, wherein angles, which are formed by the reflective structures within the plurality of sequentially arranged groups with the transparent window, are sequentially reduced.

15. An electronic device comprising:
a housing including a transparent window exposed to an outside;
a printed circuit unit comprising a printed circuit board disposed within the housing;

a reflective unit comprising a reflective surface disposed between the transparent window and the printed circuit unit and including a plurality of reflective structures configured to transmit light emitted from an illumination unit to the transparent window, the illumination unit being electrically connected to the printed circuit unit; and a fingerprint sensor disposed between the transparent window and the printed circuit unit, the fingerprint sensor being electrically connected to at least a portion of the printed circuit unit and configured to sense light transmitted through the transparent window, wherein the reflective unit includes a film disposed to face one face of the transparent window, and the plurality of reflective structures of the reflective unit protrude in a direction away from the transparent window.

16. The electronic device of claim 15, wherein each of the plurality of reflective structures is configured with a triangular prism that forms different opposite angles disposed with reference to one face of the reflective unit.

17. The electronic device of claim 16, wherein the transparent window is configured to reflect the light transmitted from the reflective unit with a top face and/or a lower face thereof to provide a light path within the transparent window.

18. The electronic device of claim 16, further comprising:

a first dielectric layer disposed between the transparent window and the reflective unit and having a refractive index between a refractive index of the reflective unit and a refractive index of the transparent window; and a second dielectric layer disposed between the transparent window and the fingerprint sensor and having a refractive index that is different from the refractive index of the first dielectric layer, wherein the second dielectric layer comprises a plurality of different layers, each of the plurality of different layers having different refractive indexes and/or different transmissivities with respect to the light.

19. The electronic device of claim 18, wherein a film layer is disposed between the transparent window and the printed circuit unit and is configured to suppress light scattering, and the film layer includes an opening in a region corresponding to the fingerprint sensor configured to provide a space, the opening configured to enable light reflected in one region of the transparent window to reach the fingerprint sensor.

* * * * *